US012736892B2

(12) United States Patent
Fukuhara et al.

(10) Patent No.: US 12,736,892 B2
(45) Date of Patent: Sep. 15, 2026

(54) IMAGE FORMING APPARATUS THAT SCANS PHOTOSENSITIVE MEMBER USING PLURALITY OF SCAN BEAMS

(71) Applicant: CANON KABUSHIKI KAISHA, Tokyo (JP)

(72) Inventors: Hiroyuki Fukuhara, Shizuoka (JP); Takashi Kawana, Tokyo (JP); Chihiro Shirakawa, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/635,338

(22) Filed: Apr. 15, 2024

(65) Prior Publication Data

US 2024/0255864 A1 Aug. 1, 2024

Related U.S. Application Data

(63) Continuation of application No. 18/112,070, filed on Feb. 21, 2023, now Pat. No. 11,988,976.

(30) Foreign Application Priority Data

Feb. 22, 2022 (JP) ................................ 2022-025606

(51) Int. Cl.
*G03G 15/043* (2006.01)

(52) U.S. Cl.
CPC ................................ *G03G 15/043* (2013.01)

(58) Field of Classification Search
CPC .................................................. G03G 15/043
USPC .......................................................... 399/51
See application file for complete search history.

(56) References Cited

U.S. PATENT DOCUMENTS

| | | | |
|---|---|---|---|
| 4,532,552 A | 7/1985 | Uno | |
| 8,493,425 B2 | 7/2013 | Furuta | |
| 9,665,031 B2 | 5/2017 | Nagasaki et al. | |
| 9,696,651 B2 * | 7/2017 | Kawana .............. | H04N 1/1135 |

(Continued)

FOREIGN PATENT DOCUMENTS

| | | | |
|---|---|---|---|
| CN | 103376694 A | 10/2013 |
| JP | 58-125064 A | 7/1983 |

(Continued)

OTHER PUBLICATIONS

Office Action dated Dec. 15, 2025, in Japanese Patent Application No. 2022-025606.

(Continued)

*Primary Examiner* — Hoan H Tran
(74) *Attorney, Agent, or Firm* — Venable LLP

(57) ABSTRACT

An image forming apparatus includes a detection unit configured to detect a first scan beam from a first light source; and a control unit. The control unit performs corrections in which a light emission period of scan beams per pixel is changed in accordance with which section is scanned by the scan beams, and performs corrections in which a light exposure amount by which the photosensitive member is exposed to light by the scan beams is changed in accordance with which section in the main scanning direction is scanned by the scan beams. Based on a detection timing at which the detection unit has detected the first scan beam, the control unit controls scan start timings at which the scan beams start scanning of the photosensitive member.

15 Claims, 35 Drawing Sheets

(56) References Cited

U.S. PATENT DOCUMENTS

| | | | | |
|---|---|---|---|---|
| 9,703,228 | B2 | 7/2017 | Seki | |
| 9,720,346 | B2 | 8/2017 | Furuta et al. | |
| 10,990,029 | B2 * | 4/2021 | Akizuki | G03G 15/0928 |
| 11,988,976 | B2 * | 5/2024 | Fukuhara | G03G 15/043 |
| 2008/0273896 | A1 * | 11/2008 | Kinoshita | G03G 15/0409 399/151 |
| 2016/0246208 | A1 | 8/2016 | Nagasaki et al. | |
| 2018/0178549 | A1 | 6/2018 | Oyama | |

FOREIGN PATENT DOCUMENTS

| | | | |
|---|---|---|---|
| JP | 2003-320703 | A | 11/2003 |
| JP | 2012-014162 | A | 1/2012 |
| JP | 2015-033795 | A | 2/2015 |
| JP | 2016-004116 | A | 1/2016 |
| JP | 2016-150580 | A | 8/2016 |
| JP | 2016-150581 | A | 8/2016 |
| JP | 2016-179553 | A | 10/2016 |
| JP | 2017-047630 | A | 3/2017 |
| JP | 2017-161854 | A | 9/2017 |
| JP | 2018-004911 | A | 1/2018 |
| JP | 2018-010160 | A | 1/2018 |
| JP | 2018-103484 | A | 7/2018 |
| JP | 2021-115807 | A | 8/2021 |

OTHER PUBLICATIONS

Office Action dated Jan. 22, 2026, in Chinese Patent Application No. 202310129764.X.

Office Action dated Mar. 23, 2026, in Japanese Patent Application No. 2022-025606.

Office Action dated Jul. 10, 2026, in Japanese Patent Application No. 2022-025606.

* cited by examiner

IMAGE FORMING APPARATUS THAT SCANS PHOTOSENSITIVE MEMBER USING PLURALITY OF SCAN BEAMS

FIELD OF THE INVENTION

The present invention relates to an image forming apparatus of an electrophotographic type.

DESCRIPTION OF THE RELATED ART

An image forming apparatus of an electrophotographic type includes a photosensitive member and an optical scanning apparatus for exposing the photosensitive member to light. The optical scanning apparatus emits a scan beam based on an image signal, causes the scan beam to be reflected by a rotative polygonal mirror, and then causes the scan beam to be transmitted through a scan lens; consequently, the charged photosensitive member is irradiated with the scan beam. The image forming apparatus forms an electrostatic latent image on the photosensitive member by performing scanning whereby the spot of the scan beam is moved on the photosensitive member by rotating the rotative polygonal mirror. Note that the moving speed of the scan beam on the photosensitive member is referenced as a scan speed, and the path of the spot of the scan beam on the photosensitive member is referenced as a scan line. Also, the direction in which the spot of the scan beam moves on the photosensitive member is referenced as a main scanning direction. Furthermore, the direction which is perpendicular to the main scanning direction and in which the scan line is formed is referenced as a sub scanning direction. On the photosensitive member, the main scanning direction is parallel to a rotation axis, and the direction opposite to the rotational direction of the photosensitive member corresponds to the sub scanning direction.

For example, a lens with the fθ characteristics can be used as the scan lens. The fθ characteristics denote optical characteristics with which the scan speed is made constant in a case where the rotative polygonal mirror is rotated at the same angular velocity. However, the scan lens with the fθ characteristics is relatively large and expensive. Therefore, there is an idea to use no scan lens, or to use a scan lens without the fθ characteristics, for the purpose of reducing the size and the cost of the image forming apparatus.

U.S. Pat. No. 4,532,552 discloses a configuration that changes the frequency of image signals so as to make the width of pixels formed on the surface of a photosensitive member constant, even in a case where the scan speed changes.

Some of the image forming apparatuses of the electrophotographic method scan different positions on a photosensitive member in the sub scanning direction, thereby exposing them to light, simultaneously by using a plurality of scan beams. In such image forming apparatuses, the positions of the plurality of spots that are formed on the photosensitive member by the plurality of scan beams differ in the main scanning direction. That is to say, for example, in a case where a first scan beam and a second scan beam are used, when the spot attributed to the first scan beam is at a first position in the main scanning direction, the position of the spot attributed to the second scan beam in the main scanning direction is different from the first position. Therefore, even if the frequency of image signals is changed based on the position of the spot of the first scan beam, the pixel width attributed to the second scan beam cannot be made constant, which could be the cause of image defect.

SUMMARY OF THE INVENTION

According to an aspect of the present invention, an image forming apparatus includes: a photosensitive member; a scan unit including at least a first light source and a second light source, the scan unit being configured to form an electrostatic latent image on the photosensitive member by emitting a first scan beam from the first light source and scanning a plurality of sections on the photosensitive member in a main scanning direction at an inconstant scan speed, and form an electrostatic latent image on the photosensitive member by emitting a second scan beam from the second light source and scanning the plurality of sections on the photosensitive member in the main scanning direction at an inconstant scan speed; a detection unit configured to detect the first scan beam; and a control unit. The control unit performs first correction in which, in order to emit the first scan beam from the first light source, a light emission period of the first scan beam per pixel is changed in accordance with which section in the main scanning direction is scanned by the first scan beam, performs second correction in which, in order to emit the first scan beam from the first light source, a light exposure amount by which the photosensitive member is exposed to light by the first scan beam is changed in accordance with which section in the main scanning direction is scanned by the first scan beam, performs third correction in which, in order to emit the second scan beam from the second light source, a light emission period of the second scan beam per pixel is changed in accordance with which section in the main scanning direction is scanned by the second scan beam, and performs fourth correction in which, in order to emit the second scan beam from the second light source, a light exposure amount by which the photosensitive member is exposed to light by the second scan beam is changed in accordance with which section in the main scanning direction is scanned by the second scan beam, and based on a detection timing at which the detection unit has detected the first scan beam, the control unit controls scan start timings at which the first scan beam and the second scan beam start scanning of the photosensitive member.

Further features of the present invention will become apparent from the following description of exemplary embodiments with reference to the attached drawings.

DESCRIPTION OF THE EMBODIMENTS

Figure 1:
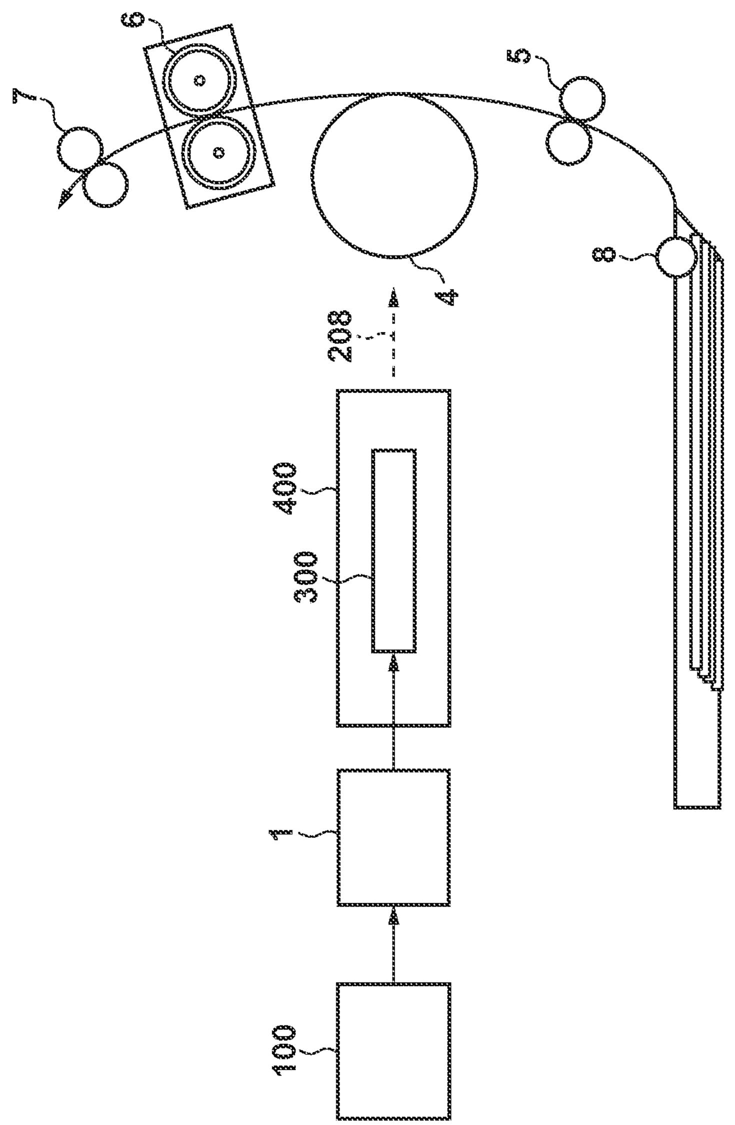
FIG. 1 is a constitutive schematic diagram of an image forming apparatus according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

FIG. 1 is a schematic configuration diagram of an image forming apparatus 9 according to the present embodiment. An image signal generation unit 100 exchanges control signals with an engine control unit 1, and under control of the engine control unit 1, outputs image signals of an image to be formed to a driving unit 300 of an optical scanning apparatus 400. Also, the engine control unit 1 outputs control signals to the driving unit 300. Based on the image signals and control signals, the driving unit 300 scans a photosensitive member 4 that has been charged by emission of scan beams (optical beams) 208, thereby exposing the same to light. As a result, an electrostatic latent image is formed on the photosensitive member 4. A non-illustrated development unit develops the electrostatic latent image on the photosensitive member 4 using toner, thereby forming a toner image on the photosensitive member 4. The toner image on the photosensitive member 4 is transferred to a recording medium (sheet) that has been fed from a cassette by a feeding roller 8 and conveyed by a conveyance roller 5. A fixing device 6 applies heat and pressure to the sheet to which the toner image has been transferred, thereby fixing the toner image onto the sheet. After the toner image has been fixed, the sheet is discharged to the outside of the image forming apparatus 9 by a discharge roller 7.

Figure 2A:
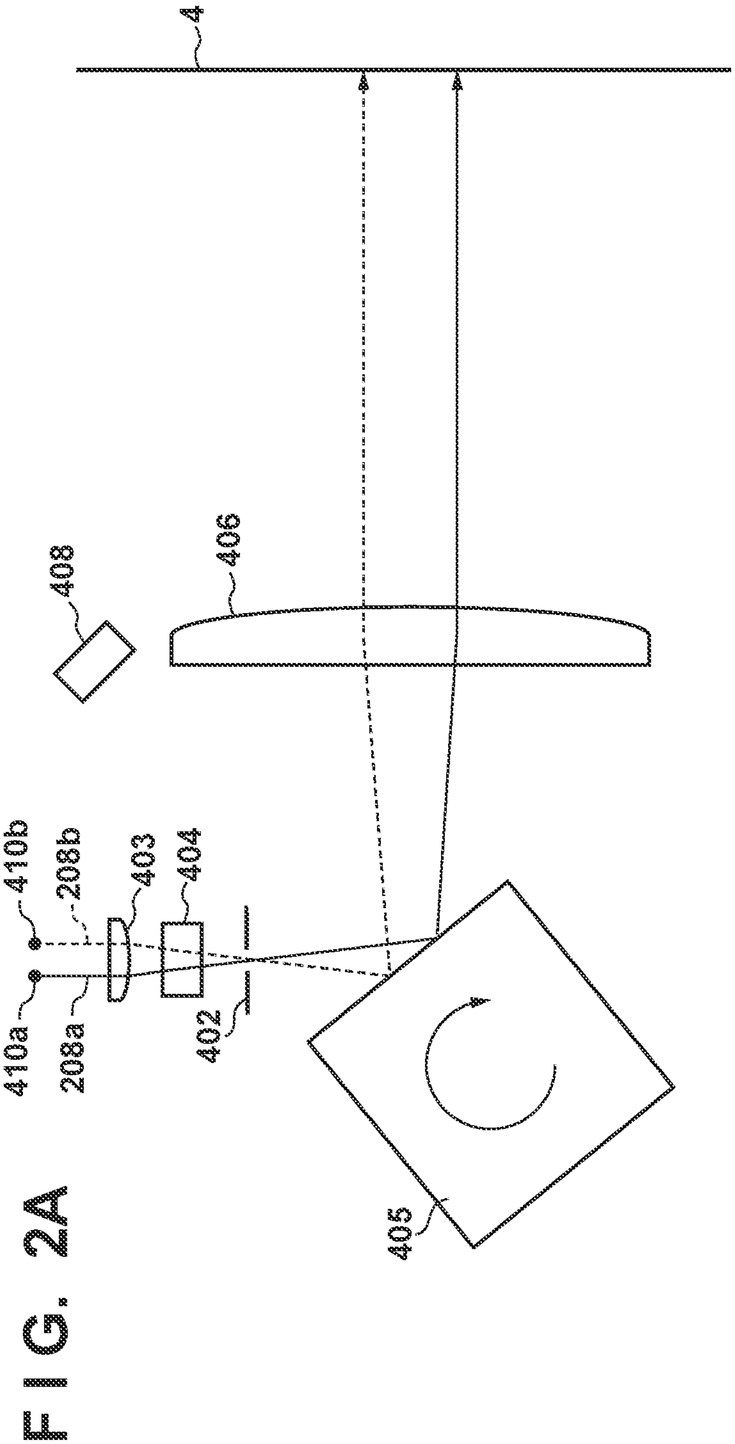
FIG. 2A is a plan view of an optical scanning apparatus according to an embodiment.
Figure 2B:
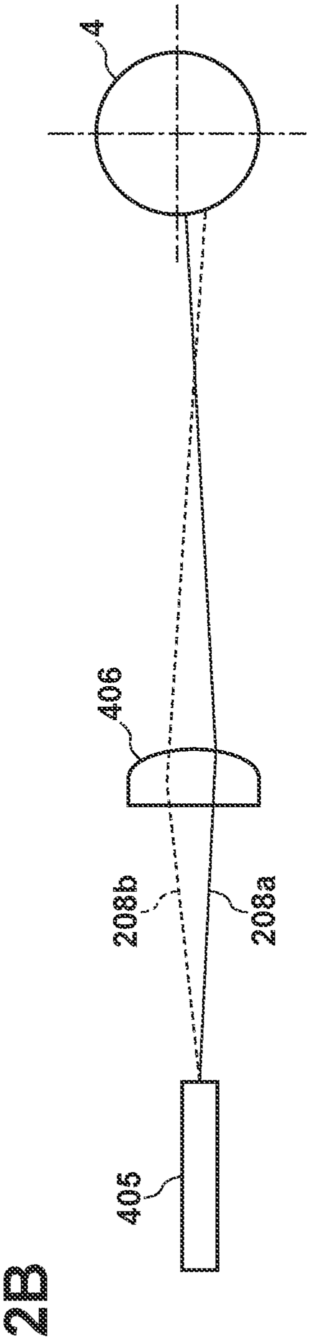
FIG. 2B is a side view of the optical scanning apparatus according to an embodiment.

FIG. 2A and FIG. 2B are configuration diagrams of the optical scanning apparatus 400. Note that in FIG. 2A, the direction from up to down is the main scanning direction. Also, in FIG. 2B, the direction perpendicular to the sheet surface corresponds to the main scanning direction. Light sources 410*a* and 410*b* are driven by the driving unit 300 and emit scan beams 208*a* and 208*b*, respectively. The light sources 410*a* and 410*b* are configured so that their light emissions are independently controllable. Note that in the following description, the light sources 410*a* and 410*b* are collectively referred to as the light sources 410, and the scan beams 208*a* and 208*b* are collectively referred to as the scan beams 208. The scan beams 208 are made incident on a coupling lens 403. The scan beams 208 that have passed through the coupling lens 403 are converted into substantially collimated beams and made incident on an anamorphic lens 404. Note that the substantially collimated beams include weak convergent beams and weak divergent beams. The anamorphic lens 404 converts the scan beams 208 into convergent beams in a cross-section taken along the main scanning direction. Also, the anamorphic lens 404 causes the scan beams 208 to be collected in the vicinity of a reflective surface of a deflector 405 in a cross-section taken along the sub scanning direction, and forms a long line image in the main scanning direction.

The scan beams 208 that have passed through the anamorphic lens 404 are shaped into an elliptic shape or a rectangular shape by an aperture stop 402. The scan beams 208 that have passed through the aperture stop 402 are reflected by the reflective surface (deflection surface) of the deflector (rotative polygonal mirror) 405. The scan beams 208 that have been reflected by the deflector 405 are transmitted through an image forming lens 406 and irradiate the photosensitive member 4. The image forming lens 406 is an image forming optical element, and causes the scan beams 208 to have a predetermined spot shape on the surface of the photosensitive member 4. By causing the deflector 405 to rotate at a constant angular velocity, the spots of the scan beams 208 move in the main scanning direction on the surface of the photosensitive member 4, and an electrostatic latent image is formed on the photosensitive member 4.

A beam detection (BD) sensor 408 detects the scan beam 208*a* that has been reflected in a predetermined direction by the deflector 405. The BD sensor 408 outputs a BD signal indicating a detection timing of the scan beam 208*a* to the engine control unit 1. Based on the BD signal, the engine control unit 1 controls timings to start rendering of the electrostatic latent image on the photosensitive member 4 using the scan beam 208*a* and the scan beam 208*b*, respectively. In the following description, the timings to start rendering of the electrostatic latent image on the photosensitive member 4 using the scan beams 208 are referred to as "formation start timings" or "scan start timings". As described above, in the present embodiment, the BD signal based on one scan beam 208 included among the plurality of scan beams 208 is used in determination of the scan start timing of each of the plurality of scan beams 208, rather than BD signals of the respective scan beams 208*a* and 208*b*.

As shown in FIG. 2A, the scan beams 208*a* and 208*b* are reflected at different positions on the reflective surface of the deflector 405. Therefore, on the photosensitive member 4, scanning by the scan beam 208*a* precedes scanning by the scan beam 208*b*. That is to say, in terms of the timing at which the same position in the main scanning direction is exposed to light, the scan beam 208*a* precedes the scan beam 208*b*. For example, the scan start timing of the scan beam 208*a* precedes the scan start timing of the scan beam 208*b*. Note that this difference between the timings becomes smaller as the position of the aperture stop 402 is brought closer to the deflector 405. Furthermore, as shown in FIG. 2B, the scan beams 208*a* and 208*b* irradiate different positions in the circumferential direction of the photosensitive member 4 (the sub scanning direction).

Figure 3:
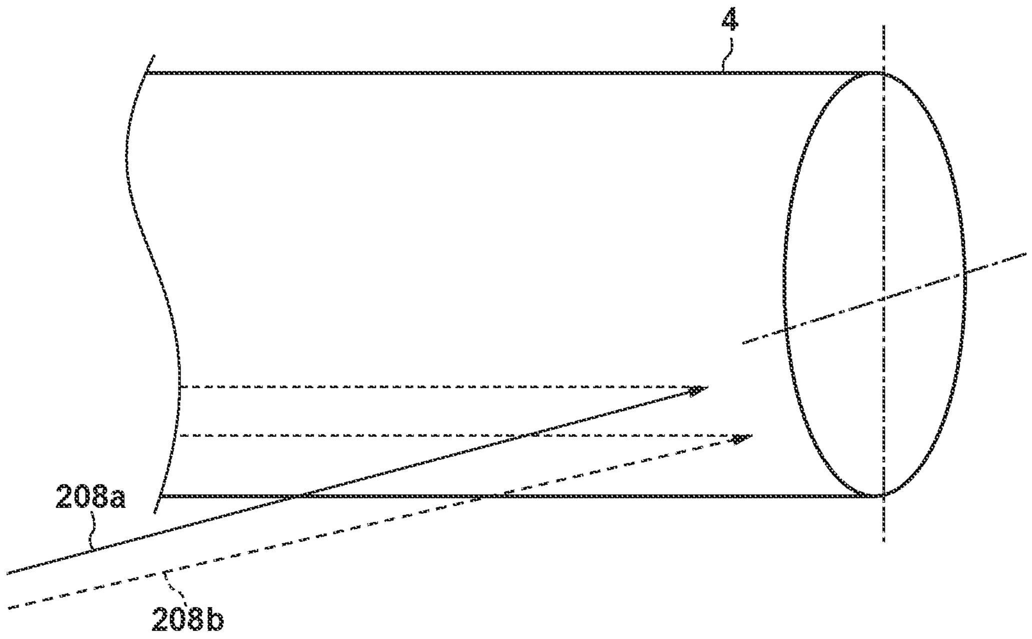
FIG. 3 is a diagram showing scanning of a photosensitive member performed by two scan beams.

FIG. 3 shows a state where the scan beams 208*a* and 208*b* are incident on the photosensitive member 4. As the scan beams 208*a* and 208*b* irradiate the photosensitive member 4 at different positions in the circumferential direction as described above, in a case where the light sources 410*a* and 410*b* emit light for the same time period, the scan line of the scan beam 208*b* becomes longer than the scan line of the scan beam 208*a*.

The image forming lens 406 according to the present embodiment does not have the so-called fθ characteristics. Therefore, rotating the deflector 405 at the same angular velocity does not make the scan speed constant. That is to say, in the optical scanning apparatus 400 according to the present embodiment, the scan speed varies depending on the position on the photosensitive member 4 in the main scanning direction (the image height). More specifically, in the optical scanning apparatus 400 according to the present embodiment, the scan speed is faster on an edge portion of the photosensitive member 4 (an outermost off-axis image height) than a central portion thereof (an on-axis image height) in the main scanning direction. By using the image forming lens 406 without the fθ characteristics, the image forming lens 406 can be arranged in proximity to the deflector 405. Furthermore, the image forming lens 406 without the fθ characteristics can be reduced in length in the main scanning direction, and in thickness in the optical axis direction, compared to an image forming lens with the fθ characteristics. That is to say, by using the image forming lens 406 without the fθ characteristics, the optical scanning apparatus 400 can be downsized.

Figure 4:
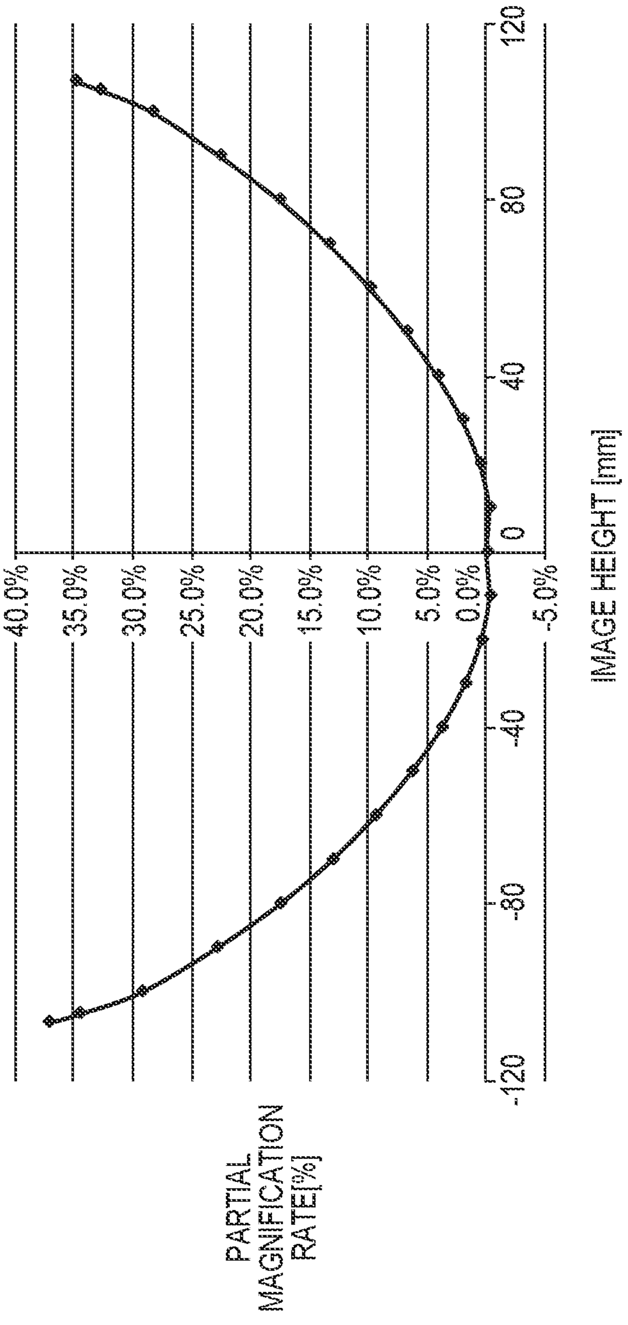
FIG. 4 is a diagram showing a relationship between an image height and a partial magnification rate in the optical scanning apparatus according to an embodiment.

FIG. 4 shows an example of a relationship between an image height of the scan beams 208 and a partial magnification rate according to the present embodiment. Note that an image height of 0 denotes a case where the spot is on the optical axis of the image forming lens 406, and is hereinafter also referenced as the on-axis image height. Also, the image height other than the on-axis image height can be referenced as an off-axis image height. Furthermore, the image height corresponding to an edge portion of a scan line can be referenced as an outermost off-axis image height. In FIG. 4, for example, an image height with a partial magnification rate of 30% means that the scan speed for this image height is 1.3 times the scan speed for an image height with a partial magnification rate of 0%. In the example of FIG. 4, the scan speed for the on-axis image height is the lowest, and the scan speed increases as the absolute value of the image height increases. Therefore, if the pixel width in the main scanning direction is decided on based on a certain time interval, the pixel width varies between the on-axis image height and the off-axis image height. Therefore, in the present embodiment, partial magnification rate correction is performed so as to make the pixel width substantially constant regardless of the image height.

Also, a time period required to scan a unit length when the image height is close to the outermost off-axis image height is shorter than a time period required to scan the unit length when the image height is close to the on-axis image height. This means that, in a case where the luminance of light emitted by the light sources 410*a* and 410*b* is constant, compared to the total amount of light exposure per unit length (hereinafter simply referred to as the amount of light exposure per unit length) when the image height is close to the on-axis image height, the amount of light exposure per unit length when the image height is close to the outermost off-axis image height is small. Therefore, in the present embodiment, luminance correction is performed, in addition to the aforementioned partial magnification rate correction, in order to achieve favorable image quality.

Figure 5:
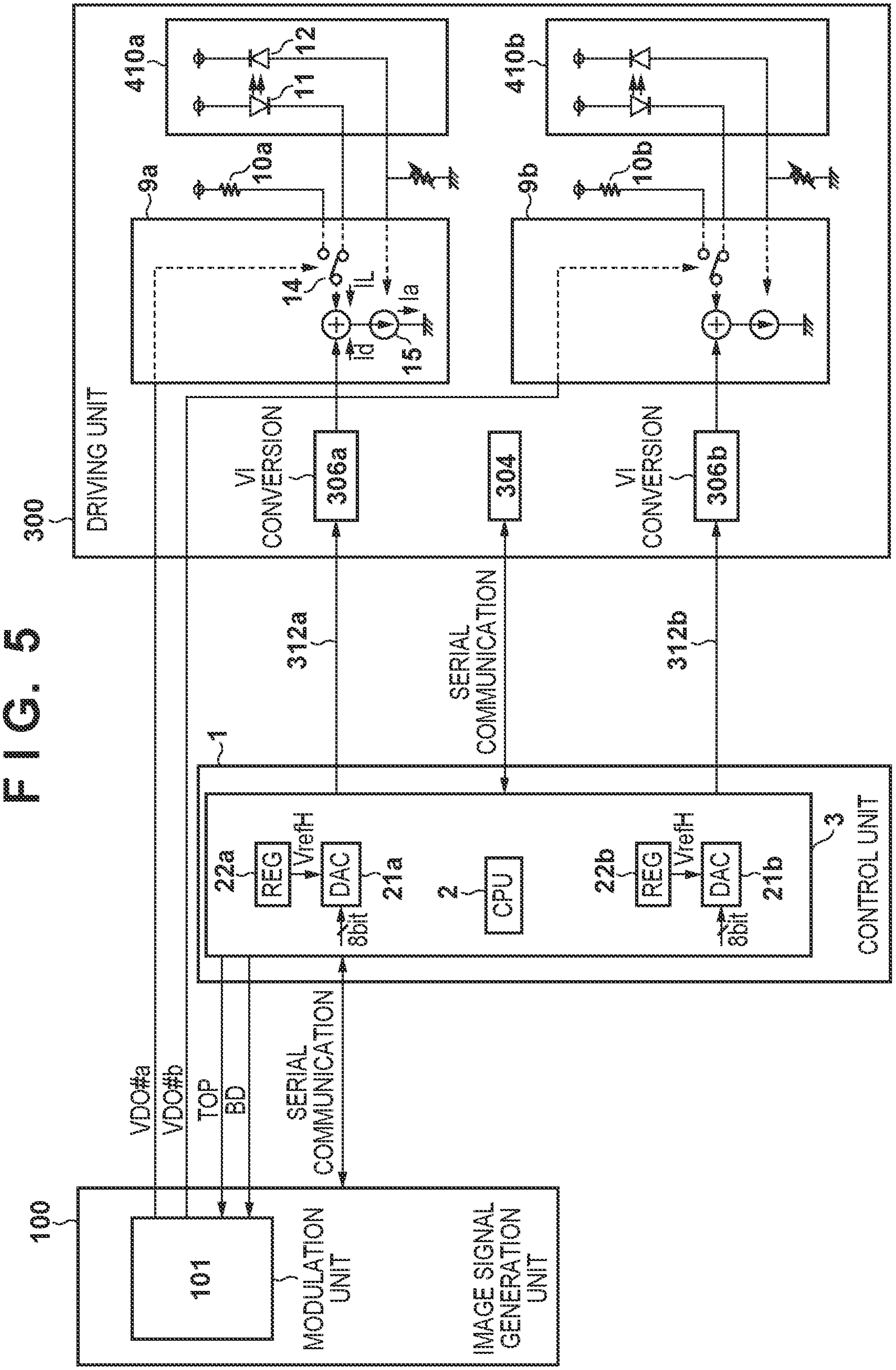
FIG. 5 is a diagram showing a configuration for exposure control according to an embodiment.

FIG. 5 is a configuration diagram of exposure control of the image forming apparatus 9 according to the present embodiment. The image signal generation unit 100 receives printing information from a non-illustrated host computer, and generates VDO #a and VDO #b, which are image signals. VDO #a and VDO #b are, for example, pulse width modulation (PWM) signals. The control unit 1 controls the image forming apparatus 9. Note that the control unit 1 also controls the luminance (the intensity of light emission of) the light sources 410*a* and 410*b* by controlling the driving unit 300. The driving unit 300 causes the light source 410*a* to emit light by supplying a current to the light source 410*a* based on VDO #a. Similarly, the driving unit 300 causes the light source 410*b* to emit light by supplying a current to the light source 410*b* based on VDO #b.

Upon completion of preparation for output of image signals for image formation, the image signal generation unit 100 instructs the control unit 1 to start printing via serial communication. Upon completion of preparation for printing, the control unit 1 transmits a TOP signal, which is a synchronization signal for the sub scanning direction, and a BD signal, which is a synchronization signal for the main scanning direction, to the image signal generation unit 100. Note that the control unit 1 receives the BD signal from the driving unit 300. The image signal generation unit 100 outputs VDO #a to the driving unit 300 after a first period from receiving the BD signal. Also, the image signal generation unit 100 outputs VDO #b to the driving unit 300 after a second period from receiving the BD signal. Note that the second period is longer than the first period. The difference between the second period and the first period corresponds to the difference between the scan start timing of the scan beam 208*a* and the scan start timing of the scan beam 208*b*. Note that the first period is set so that the scan position of the scan beam 208*a* in the main scanning direction at a timing when the first period has elapsed since the BD signal was received, is a formation start position at which the formation of an electrostatic latent image is started. Similarly, the second period is set so that the scan position of the scan beam 208*b* in the main scanning direction at a timing when the second period has elapsed since the BD signal was received, is the formation start position. Note that hereinafter, the formation start position is also referenced as a scan start position. Furthermore, in the following description, VDO #a and VDO #b are also collectively referred to as VDO signals. The details of constituents inside the image signal generation unit 100, control unit 1, and driving unit 300 shown in FIG. 5 will be described later.

Figure 6A:
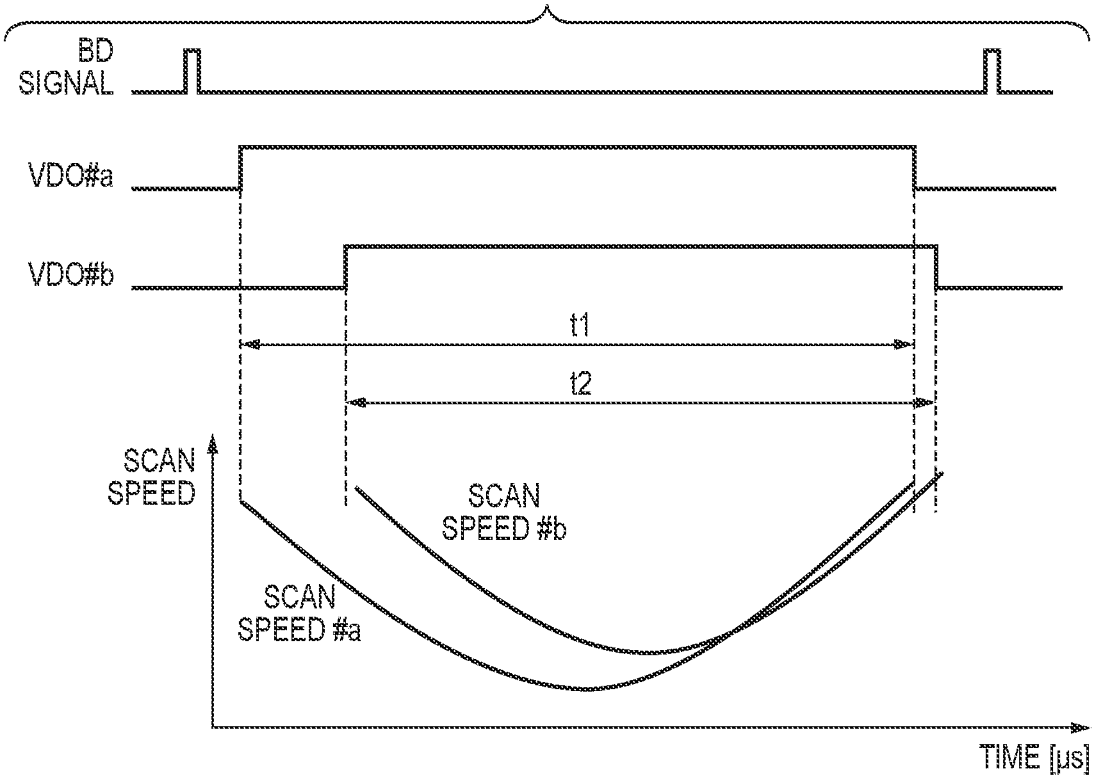
FIG. 6A is a diagram showing the changes in the scan speed according to an embodiment.
Figure 6B:
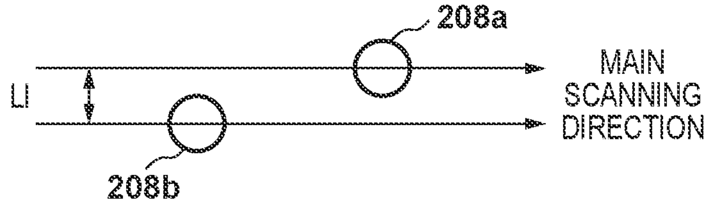
FIG. 6B is a diagram showing a positional relationship between scan beams according to an embodiment.

FIG. 6B shows a positional relationship between the scan beam 208*a* and the scan beam 208*b* on the photosensitive member 4 at a certain moment. As described above, scanning by the scan beam 208*a* precedes scanning by the scan beam 208*b*. The interval between the scan beam 208*a* and the scan beam 20*b* in the sub scanning direction has a predetermined value LI. FIG. 6A shows a relationship among timings of the BD signal, VDO #a, and VDO #b while each of the scan beams 208*a* and 208*b* performs scanning of one line. The BD signal is a signal indicating the base for the timing to start single scanning. Once the image signal generation unit 100 has received a rising edge of the BD signal, it outputs VDO #a after the first period. Similarly, once the image signal generation unit 100 has received the rising edge of the BD signal, it outputs VDO #b after the second period. The light source 410*a* performs scanning of one line by outputting the scan beam 208*a* based on VDO #a. The light source 410*b* performs scanning of one line by outputting the scan beam 208*b* based on VDO #b. FIG. 6A also shows the scan speed #a of the scan beam 208*a* and the scan speed #b of the scan beam 208*b*.

Figure 6C:
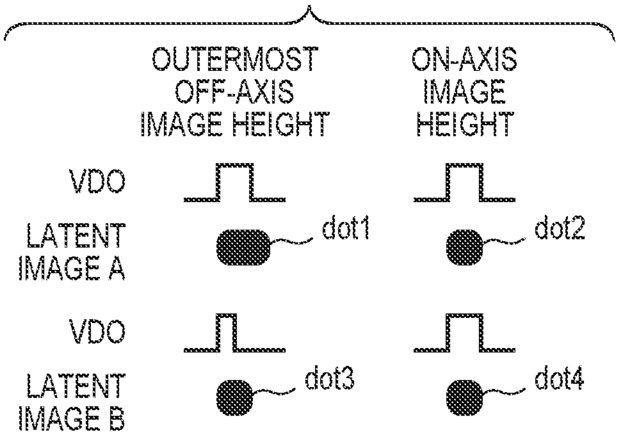
FIG. 6C is a diagram showing pixel widths in a formed image according to an embodiment.

As shown in FIG. 6A, the scan speed increases toward the outermost off-axis image height. Therefore, if the same scan time period is set for one pixel regardless of the image height, the width of a pixel of the outermost off-axis image height (dot1) becomes larger than the width of a pixel of the on-axis image height (dot2) as indicated by a latent image A in FIG. 6C. Therefore, in the present embodiment, partial magnification rate correction is performed whereby a time period of light emission for one pixel based on VDO #a and VDO #b is changed in accordance with the scan position in the main scanning direction, as stated earlier. Through this partial magnification rate correction, the width of one pixel is brought close to the same width regardless of the image height. FIG. 6C shows a state where the difference between the width of a pixel of the outermost off-axis image height (dot3) and the width of a pixel of the on-axis image height (dot4) has become small compared to a case where the partial magnification rate correction is not performed.

Note that as mentioned earlier, in a case where the light sources 410*a* and 410*b* emit light for the same time period, the scan line of the scan beam 208*b* becomes longer than the scan line of the scan beam 208*a*. In the present embodiment, in order to equalize the lengths of the scan line #a and the scan line #b, an output time period t1 of VDO #a for single scanning is made longer than an output time period t2 of VDO #b for single scanning as shown in FIG. 6A. Furthermore, the scan speed #a and the scan speed #b change in such a manner that they differ from each other during single scanning as shown in FIG. 6A. Therefore, the partial magnification rate correction is performed independently with respect to VDO #a and VDO #b.

Figure 7:
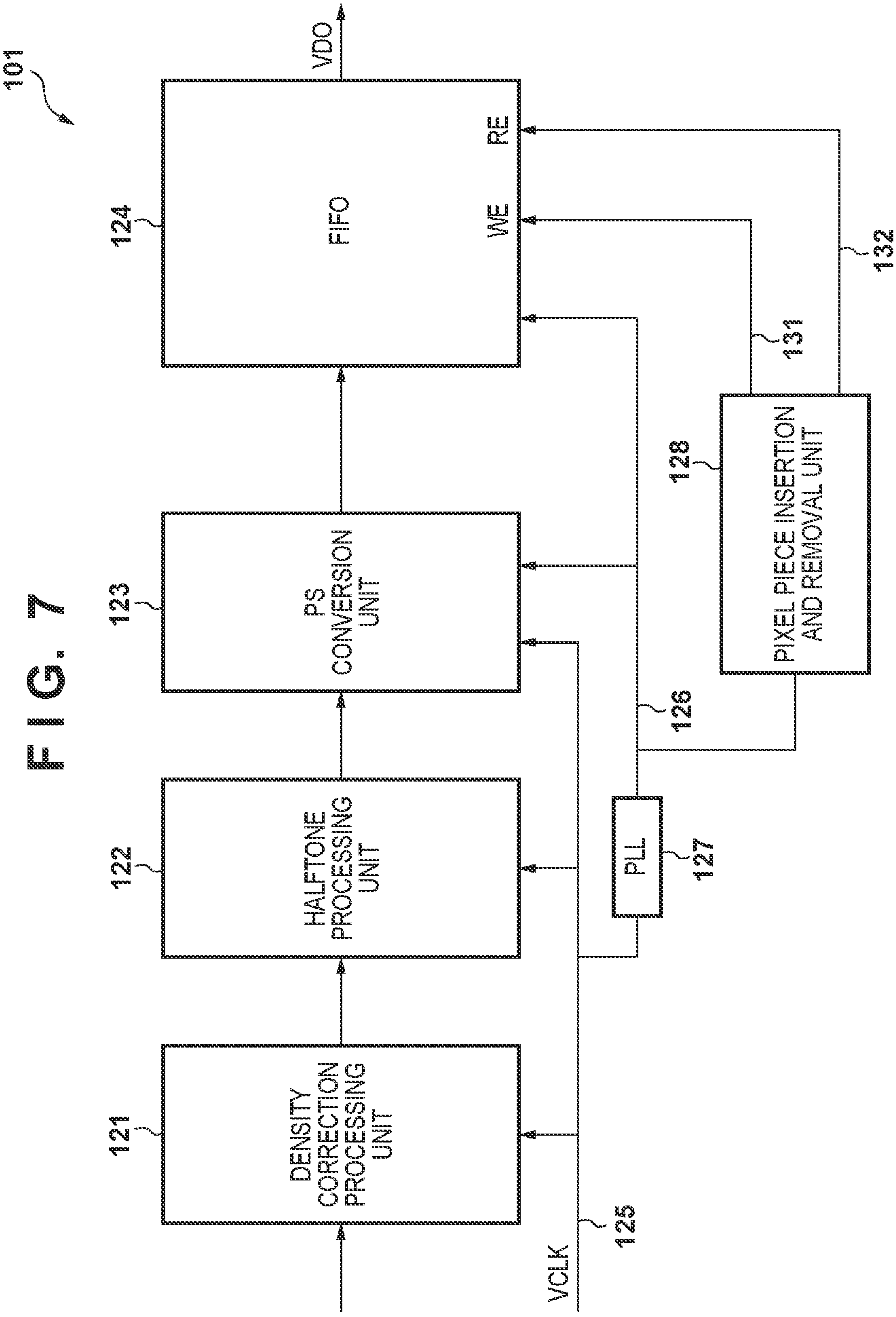
FIG. 7 is a block diagram of a modulation unit according to an embodiment.

FIG. 7 is a block diagram of a modulation unit 101 in the image signal generation unit 100. A density correction processing unit 121 performs density correction processing with respect to image data received from a non-illustrated host computer. Specifically, the density correction processing unit 121 holds a density correction table. The density correction table is information indicating a relationship between input pixel values and output pixel values. The density correction processing unit 121 references the density correction table using the pixel values of respective pixels indicated by the received image data as input pixel values, and outputs corresponding output pixel values to a halftone processing unit 122.

Figure 8A:
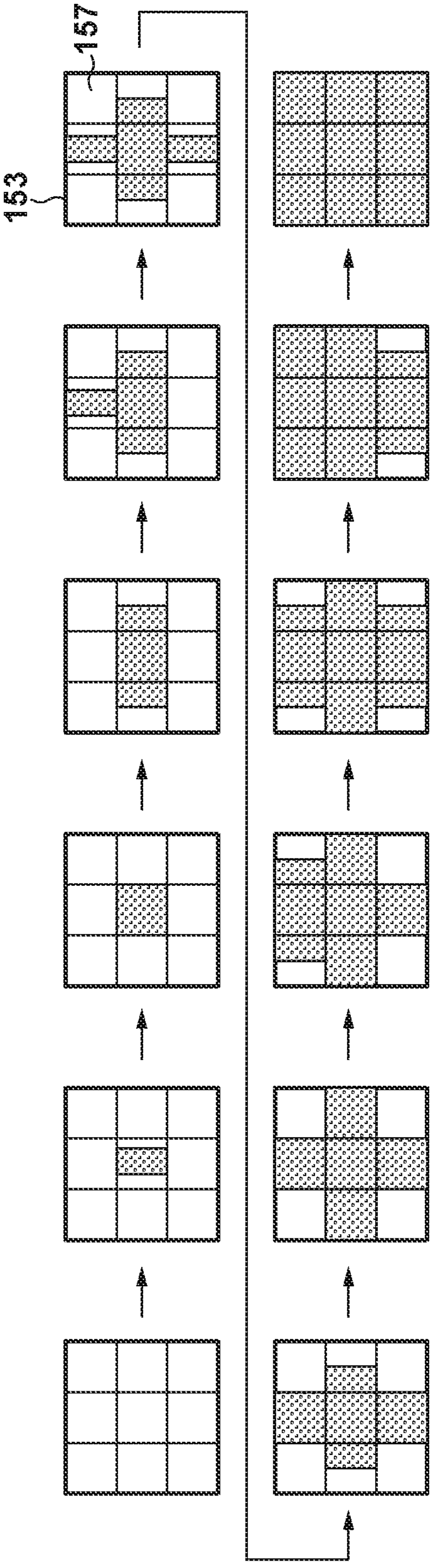
FIG. 8A is a diagram showing an example of screening.
Figure 8B:
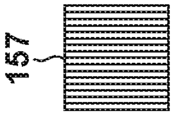
FIG. 8B is a diagram illustrating pixel pieces.

The halftone processing unit 122 performs halftone (screening) processing with respect to the input image data. FIG. 8A is a diagram illustrating an example of the halftone processing performed by the halftone processing unit 122. In the example of FIG. 8A, density is represented using a 200-line matrix 153 that includes three pixels in each of the main scanning direction and the sub scanning direction. Note that reference sign 157 indicates one pixel. In the figure, white portions are non-exposure regions that are not to be exposed to light, whereas black portions are exposure regions that are to be exposed to light. FIG. 8A shows that exposure regions increase with an increase in tones. As shown in FIG. 8B, one pixel 157 is divided into a plurality of pixel pieces. Note that in the example of FIG. 8B, one pixel is divided into 16 pixel pieces. In the present embodiment, exposure regions or non-exposure regions are set in units of pixel pieces. A parallel-serial (PS) conversion unit 123 converts a parallel signal input from the halftone processing unit 122 into a serial signal. The serial signal output from the PS conversion unit 123 is a PWM signal, and one pulse corresponds to one pixel piece. For example, when a pulse is at a high level, the corresponding pixel piece is exposed, whereas when a pulse is at a low level, the corresponding pixel piece is unexposed.

A phase-locked loop (PLL) 127 generates an image clock 126 based on a clock (VCLK) 125, and outputs the same to the PS conversion unit 123, a first-in first-out (FIFO) 124, and a pixel piece insertion and removal unit 128. Note that the VCLK 125 is also input to the density correction processing unit 121, halftone processing unit 122, and PS conversion unit 123.

In the present embodiment, the pixel piece insertion and removal unit 128 performs partial magnification rate correction based on partial magnification rate correction information, which will be described later. Specifically, the pixel piece insertion and removal unit 128 brings the length of each pixel on the photosensitive member 4 in the main scanning direction close to a target value by inserting or removing pixel pieces (pulses of the PWM signal) based on the partial magnification rate correction information. For the partial magnification rate correction, the pixel piece insertion and removal unit 128 controls a write enable (WE) signal 131 and a read enable (RE) signal 132 output to the FIFO 124. The FIFO 124 imports the serial signal from the PS conversion unit 123 only in a case where the WE signal 131 is at a "high level". In a case where a pixel piece is to be removed for the purpose of the partial magnification rate correction, the pixel piece insertion and removal unit 128 sets the WE signal 131 at a "low level". The FIFO 124 accumulates data imported from the PS conversion unit 123 in a buffer. The FIFO 124 reads out data that has been accumulated only in a case where the RE signal 132 is at a "high level" in synchronization with the image clock 126, and outputs the data as a VDO signal. In a case where a pixel piece is to be inserted for the purpose of the partial magnification rate correction, the pixel piece insertion and removal unit 128 sets the RE signal 132 at a "low level". In this way, the FIFO 124 continuously outputs data corresponding to an immediately preceding pixel piece without updating data that is output. That is to say, a pixel piece to be inserted is the same as a pixel piece that is located immediately upstream in the main scanning direction. Note that as the FIFO 124 reads out the accumulated data in synchronization with the image clock 126, the frequency of a VDO signal, which is an image signal, coincides with the frequency of the image clock 126.

Returning to FIG. 5, a description is now given of constituents for controlling the intensity of light emission (luminance) of the light sources 410*a* and 410*b*. The control unit 1 is provided with an IC 3 that includes a CPU core 2, 8-bit digital-analog converters (DACs) 21*a* and 21*b*, and regulators (REGs) 22*a* and 22*b* built therein. The driving unit 300 includes a memory 304, VI conversion circuits 306*a* and 306*b* that convert voltage into current, driver ICs 9*a* and 9*b*, light sources 410*a* and 410*b*, and dummy resistors 10*a* and 10*b*. Note that in FIG. 5, members with reference signs that end with characters "a" and "b" are members for controlling the luminance of the light sources 410*a* and 410*b*, respectively, and members with reference signs that do not end with a character are members that are mutually used for controlling the luminance of the light sources 410*a* and 410*b*. The constituents for controlling the luminance of the light sources 410*a* and 410*b* are similar; therefore, hereinafter, reference signs with omission of the last characters will be inclusively used therefor.

The memory 304 stores partial magnification rate information and luminance correction information that indicates correction values for current to be supplied to the light sources 410. The IC 3 sets a voltage to be output from the REGs 22 to the DACs 21. This voltage serves as a reference voltage for the DACs 21. Next, the IC 3 sets input data of the DACs 21 based on the luminance correction information stored in the memory 304, and causes the DACs 21 to output a luminance correction voltage 312 in synchronization with the BD signal. The VI conversion circuits 306 convert this luminance correction voltage 312 into a luminance correction current Id and output the same to the driver ICs 9.

The driver ICs 9 switch between light emission units 11 of the light sources 410 and the dummy resistors 10 as a destination of a current IL by controlling switches 14 based on VDO signals, thereby controlling ON/OFF of light emission of the light sources 410. The current value of the current IL is obtained by subtracting the current value of the luminance correction current Id output from the VI conversion circuits 306 from the current value of a current Ia flowing through constant current circuits 15. Note that feedback control is performed with respect to the current value of the current Ia flowing through the constant current circuits 15 so that the luminance of light emitted by the light sources 410 has a predetermined value based on the value detected by photodetectors 12 provided in the light sources 410. Note that this feedback control is performed when, for example, the luminance correction current Id has a current value of 0.

As described above, the current value of the current IL can be changed by controlling the value of the luminance correction current Id based on data input to the DACs 21. The luminance of the light sources 410 can be adjusted by controlling the current IL flowing through the light emission units 11 of the light sources 410. In this manner, luminance correction is executed by the control unit 1 in the present embodiment.

Figure 9:
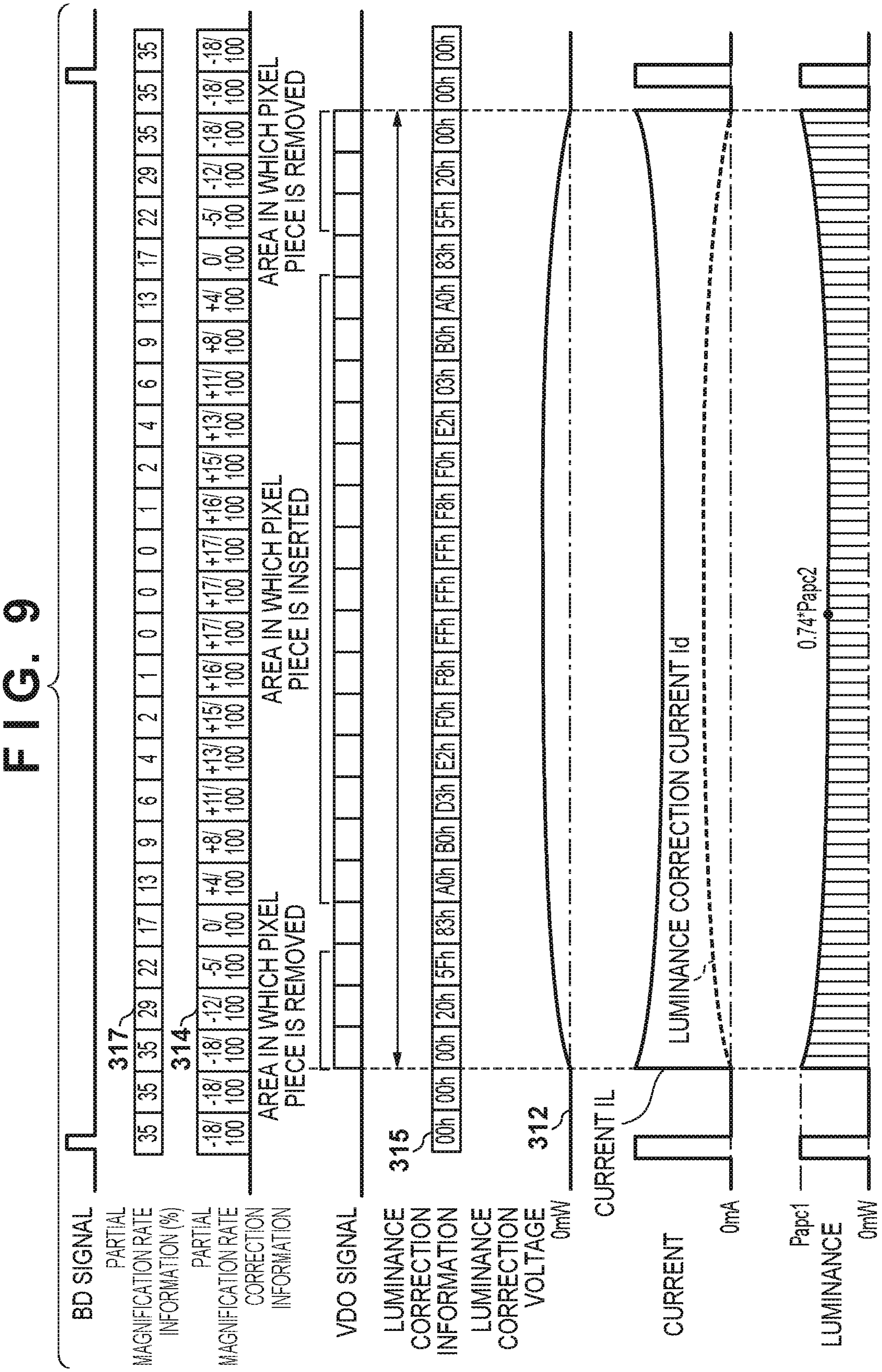
FIG. 9 is a timing chart of partial magnification rate correction and luminance correction.

FIG. 9 is a timing chart for describing the partial magnification rate correction and the luminance correction according to the present embodiment. As stated earlier, the memory 304 of the driving unit 300 stores partial magnification rate information 317. As shown in FIG. 9, the partial magnification rate information 317 indicates the rate of change in the scan speed for each image height relative to the base scan speed. In the example of FIG. 9, the base scan speed is the scan speed for the on-axis image height. Note that in the present embodiment, it is assumed that the main scanning direction is divided into a plurality of sections, and the partial magnification rate information indicates partial magnification rates for the respective sections. According to FIG. 9, the partial magnification rate for sections in the vicinity of the on-axis image height is 0. The partial magnification rate increases toward an edge portion of a scan line; the partial magnification rate for sections in the vicinity of the outermost off-axis image height is 35%.

The CPU 2 of the control unit 1 reads out the partial magnification rate information 317 from the memory 304 via serial communication, generates partial magnification rate correction information 314 based on the partial magnification rate information 317, and notifies the pixel piece insertion and removal unit 128 in the modulation unit 101 of the same. Note that it is also possible to adopt a configuration in which the partial magnification rate correction information 314 is stored in the memory 304 in advance. The partial magnification rate correction information 314 in FIG. 9 indicates the number of pixel pieces to be inserted or removed for every 100 pixel pieces. Note that a negative value indicates that pixel pieces are removed, and a positive value indicates that pixel pieces are inserted. The partial magnification rate correction information 314 in FIG. 9 indicates that 17 pixel pieces are inserted for every 100 pixel pieces in sections in the vicinity of the on-axis image height, whereas 18 pixel pieces are removed for every 100 pixel pieces in sections in the vicinity of the outermost off-axis image height.

Furthermore, the CPU 2 reads out luminance correction information 315 from the memory 304. Similarly to the partial magnification rate information 317, the luminance correction information 315 is information which is set for each section in the main scanning direction, and which is for determining a value that is set as an input to the DACs 21 when the section is scanned by the scan beams 208. The DACs 21 output the luminance correction voltage 312 in accordance with input data, and the VI conversion circuits 306 accordingly output the luminance correction current Id with a current value corresponding to the voltage value of the luminance correction voltage 312 to the driver ICs 9. As stated earlier, a change in the luminance correction current Id causes the current IL to change, and also causes the luminance of light emitted by the light sources 410 to change. In the example of FIG. 9, the luminance correction information 315 is set so that the luminance correction voltage 312 becomes the lowest at the outermost off-axis image height, and becomes the highest in the vicinity of the on-axis image height. Therefore, the current IL becomes the largest at the outermost off-axis image height, and becomes the smallest in the vicinity of the on-axis image height. In FIG. 9, Papc1 is the luminance of light emitted by the light sources 410 when the luminance correction current Id is 0. As shown in FIG. 9, the luminance of light emitted by the light sources 410 at the on-axis image height is 0.74 times the luminance of light emitted by the light sources 410 at the outermost off-axis image height. This is because the scan speed for the on-axis image height is 1/1.35≈0.74 times the scan speed for the outermost off-axis image height.

Figure 10:
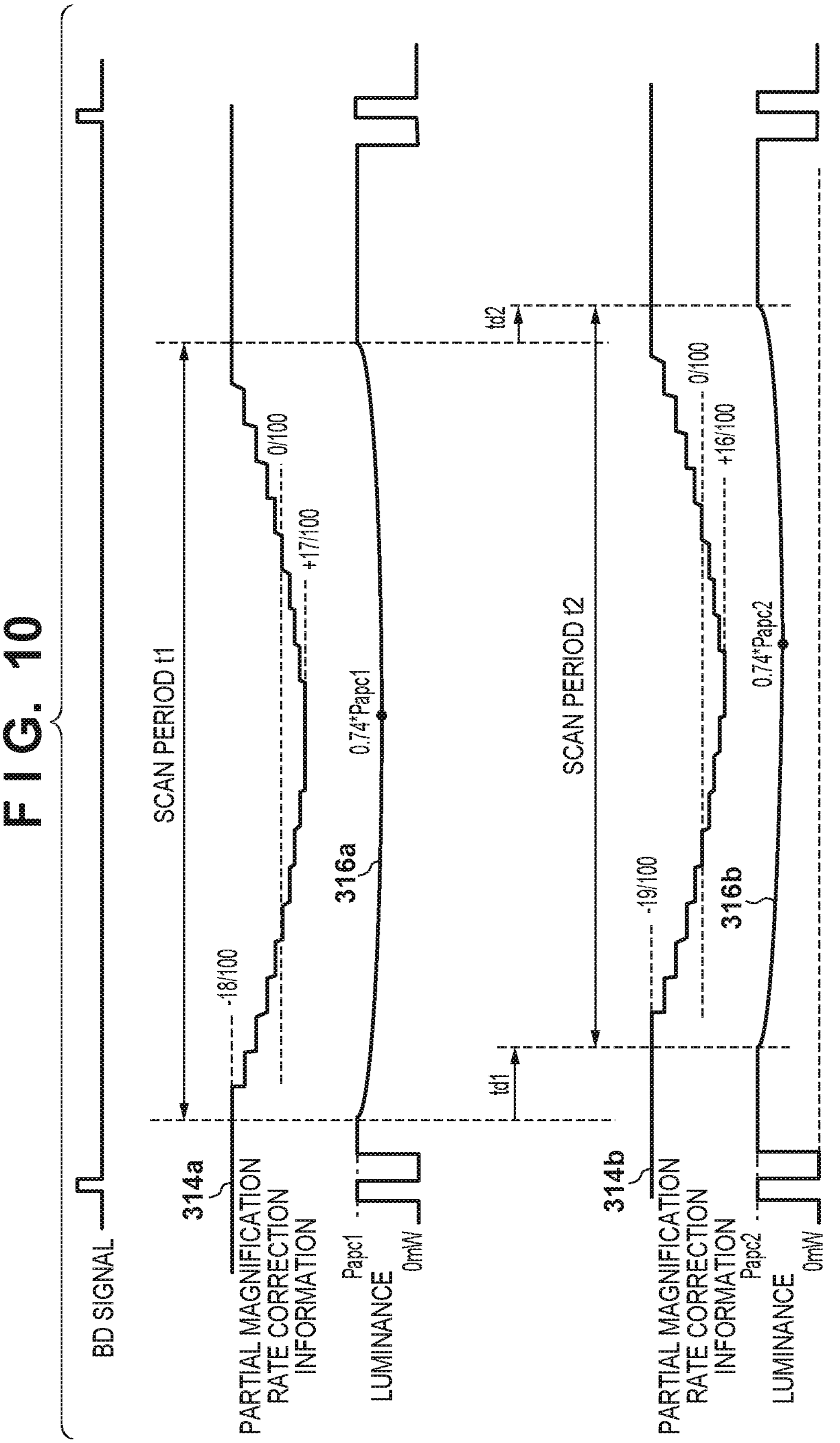
FIG. 10 is a timing chart of partial magnification rate correction and luminance correction according to an embodiment.

FIG. 10 shows a timing chart of the partial magnification rate correction and the luminance correction for a case where the scan beam 208*a* of the light source 410*a* and the scan beam 208*b* of the light source 410*b* are used. Partial magnification rate correction information 314*a* of FIG. 10 is used in the partial magnification rate correction that is performed when generating VDO #a for controlling ON/OFF of the light source 410*a*. Similarly, partial magnification rate correction information 314*b* is used in the partial magnification rate correction that is performed when generating VDO #b for controlling ON/OFF of the light source 410*b*. Furthermore, reference sign 316*a* indicates a relationship between the luminance of light emitted by the light source 410*a* and sections, and reference sign 316*b* indicates a relationship between the luminance of light emitted by the light source 410*b* and sections. Note that in FIG. 10, Papc1 and Papc2 indicate the luminance of light emitted by the light source 410*a* and the light source 410*b* when the luminance correction current Id is 0.

As stated earlier, the scan start timing when the scan beam 208*b* emitted by the light source 410*b* arrives at the formation start position of an electrostatic latent image, succeeds the scan start timing when the scan beam 208*a* emitted by the light source 410*a* arrives at the formation start position of the electrostatic latent image. In FIG. 10, the difference between these timings is td1. Also, as stated earlier, in order for the scan line of the scan beam 208*a* and the scan line of the scan beam 208*b* to have the uniform length, a scan period t1 of the scan beam 208*a* is longer than a scan period t2 of the scan beam 208*b*. Therefore, provided that a period between the completion of scanning by the scan beam 208*a* and the completion of scanning by the scan beam 208*b* is td2, td1>td2 is satisfied.

Furthermore, even if the light sources 410*a* and 410*b* emit light for the same time period, the scan line of the scan beam 208*b* becomes longer than the scan line of the scan beam 208*a*. That is to say, the scan speed of the scan beam 208*b* is faster than the scan speed of the scan beam 208*a*. Therefore, the amount of pixel pieces extracted at the outermost off-axis image height based on VDO #b is larger than the amount of pixel pieces extracted at the outermost off-axis image height based on VDO #a. Similarly, the amount of pixel pieces inserted at the on-axis image height based on VDO #b is smaller than the amount of pixel pieces inserted at the on-axis image height based on VDO #a. Thus, in FIG. 10, the partial magnification rate correction information 314*a* for scanning by the scan beam 208*a* is different from the partial magnification rate correction information 314*b* for scanning by the scan beam 208*b*. On the other hand, in FIG. 10, the luminance correction information 315 for scanning by the scan beam 208*a* is the same as the luminance correction information 315 for scanning by the scan beam 208*b*. Note that FIG. 10 shows a relationship between time and luminance, instead of a relationship between the position in the main scanning direction and luminance. Therefore, the form of the change in luminance attributed to the elapse of time since the scan beam 208*a* arrived at the formation start position of an electrostatic latent image, differs from the form of the change in luminance attributed to the elapse of time since the scan beam 208*b* arrived at the formation start position of the electrostatic latent image.

In this manner, in the present embodiment, the partial magnification rate correction (first correction) and the luminance correction (second correction) are performed with respect to each of scanning by the scan beam 208*a* and scanning by the scan beam 208*b*. The partial magnification rate correction is intended to correct a scan time period (a light emission period) for forming one pixel in accordance with the position in the main scanning direction so that the width of a pixel formed on the photosensitive member 4 by each of the two scan beams 208*a* and 208*b* has a predetermined value. On the other hand, the luminance correction is intended to correct the amount of light exposure for a pixel formed by each of the scan beams 208*a* and 208*b* in accordance with the position in the main scanning direction so that the density of a pixel formed on the photosensitive member 4 by each of the scan beams 208*a* and 208*b* becomes the density corresponding to the pixel value of the pixel.

Note that the partial magnification rate correction information 314 is used in the partial magnification rate correction, whereas the luminance correction information 315 is used in the luminance correction. The partial magnification rate correction information 314 is information indicating a relationship between the position or section in the main scanning direction and the amount of inserted or removed pixel pieces. The luminance correction information 315 is information indicating a relationship between the position or section in the main scanning direction and the amount of correction of the luminance of light emitted by the light sources. In FIG. 10, discrete pieces of partial magnification rate correction information 314 are used for the scans that are respectively performed by the scan beams 208*a* and 208*b*, and shared luminance correction information 315 is used therefor. This configuration makes it possible to perform exposure while suppressing image defect, even in a case where scanning is performed with a plurality of scan beams without using a scan lens with the fθ characteristics.

Figure 11:
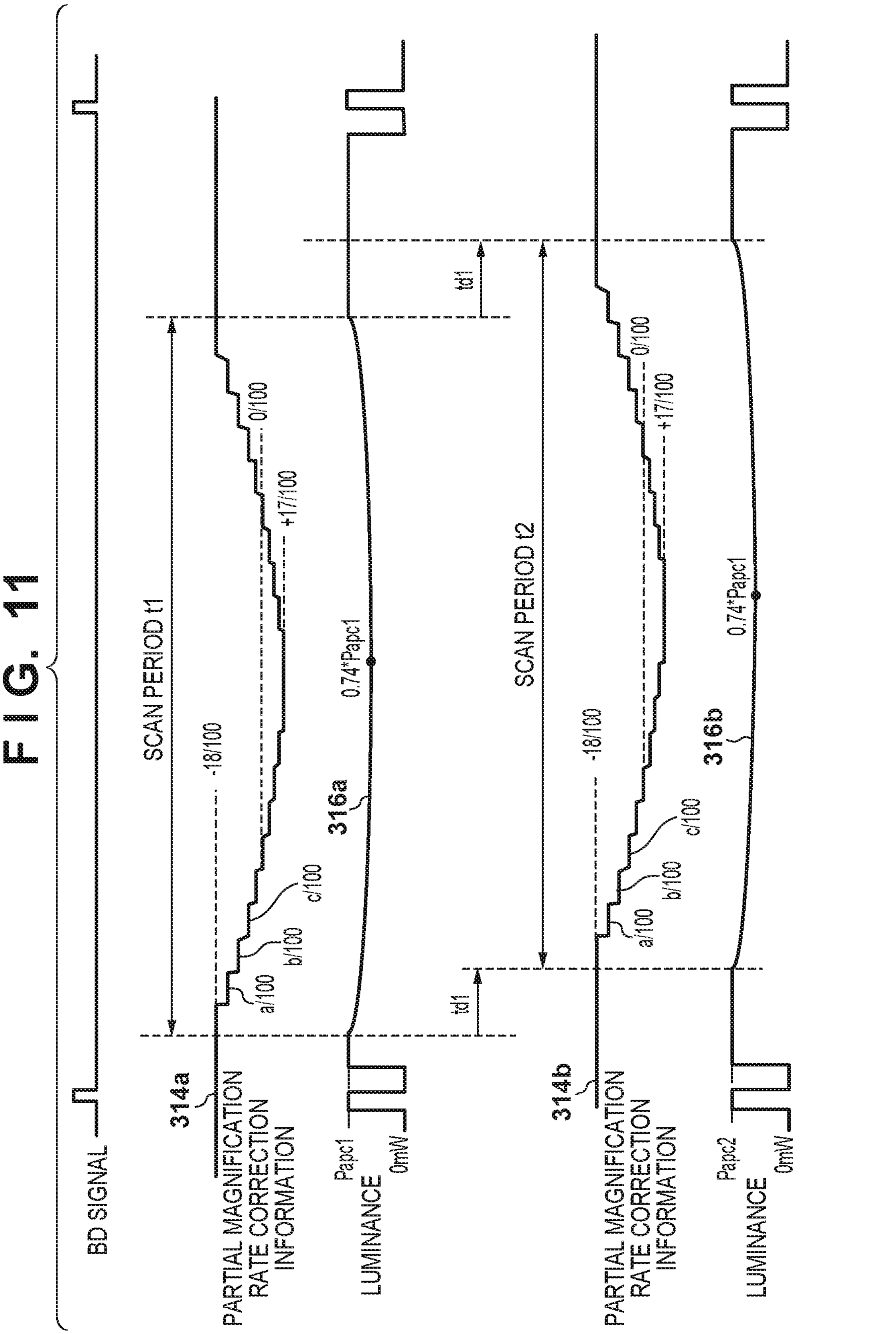
FIG. 11 is a timing chart of partial magnification rate correction and luminance correction according to an embodiment.

In FIG. 10, discrete pieces of partial magnification rate correction information 314 and shared luminance correction information 315 are used for the scan beam 208*a* and the scan beam 208*b*. However, in the case of an image in which minute density variations in single scanning are unnoticeable, such as a monochrome image, it is permissible to adopt a configuration that uses shared partial magnification rate correction information 314 for scanning by each scan beam. In this case, the result of averaging the pieces of partial magnification rate correction information 314 for the respective scan beams can be used as the shared partial magnification rate correction information 314. FIG. 11 shows an example in which the shared partial magnification rate correction information 314 and the shared luminance correction information 315 are used for the scan beam 208*a* and the scan beam 208*b*. Using the shared partial magnification rate correction information 314 can reduce the amount of information stored in the memory 304 for each correction.

Figure 12:
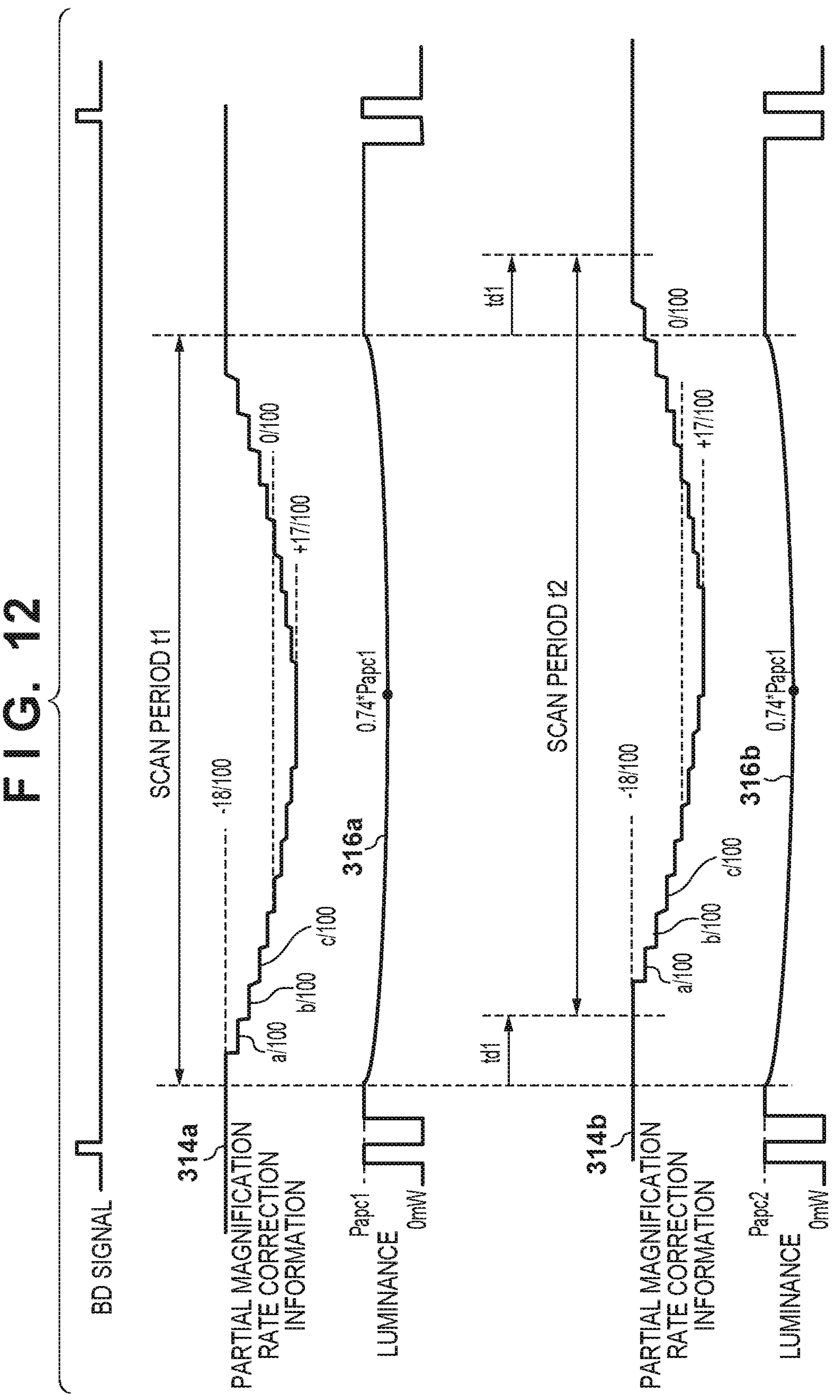
FIG. 12 is a timing chart of partial magnification rate correction and luminance correction according to an embodiment.
Figure 18:
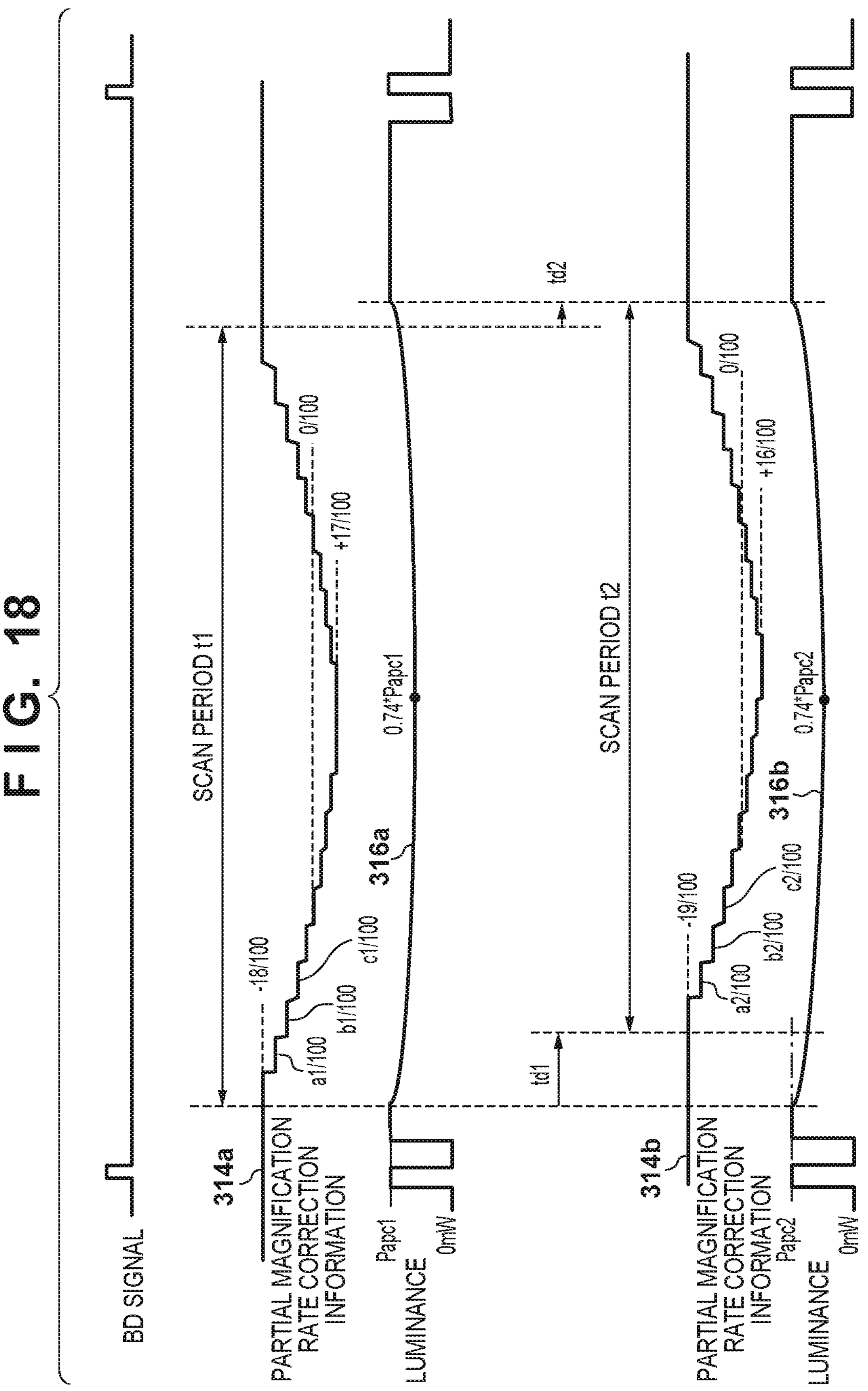
FIG. 18 is a timing chart of partial magnification rate correction and luminance correction according to an embodiment.

Furthermore, as the luminance correction causes luminance to change gently, it is also possible to cause the luminance of the light source 410*a* and the luminance of the light source 410*b* to change in a similar manner as shown in FIG. 12. That is to say, in FIG. 10 and FIG. 11, although the same luminance correction information 315 is used, the amount of correction of the luminance of the scan beam 208*a* at a certain moment differs from the amount of correction of the luminance of the scan beam 208*b*. This is because, as shown in FIG. 10 and FIG. 11, the luminance correction for the scan beam 208*b* is started a period td1 after the luminance correction for the scan beam 208*a*. In FIG. 12, the luminance correction for the scan beam 208*b* is started at the same timing as, and causes the change in a manner similar to, the luminance correction for the scan beam 208*a*. As shown in FIG. 12, by performing the shared and same luminance correction with respect to the scan beam 208*a* and the scan beam 208*b*, luminance correction circuits can be shared between the scan beam 208*a* and the scan beam 208*b*. FIG. 18 is a timing chart for a case where shared luminance correction is performed with respect to the scan beam 208*a* and the scan beam 208*b* in the configuration that uses the discrete pieces of partial magnification rate correction information 314 shown in FIG. 10.

Figure 26:
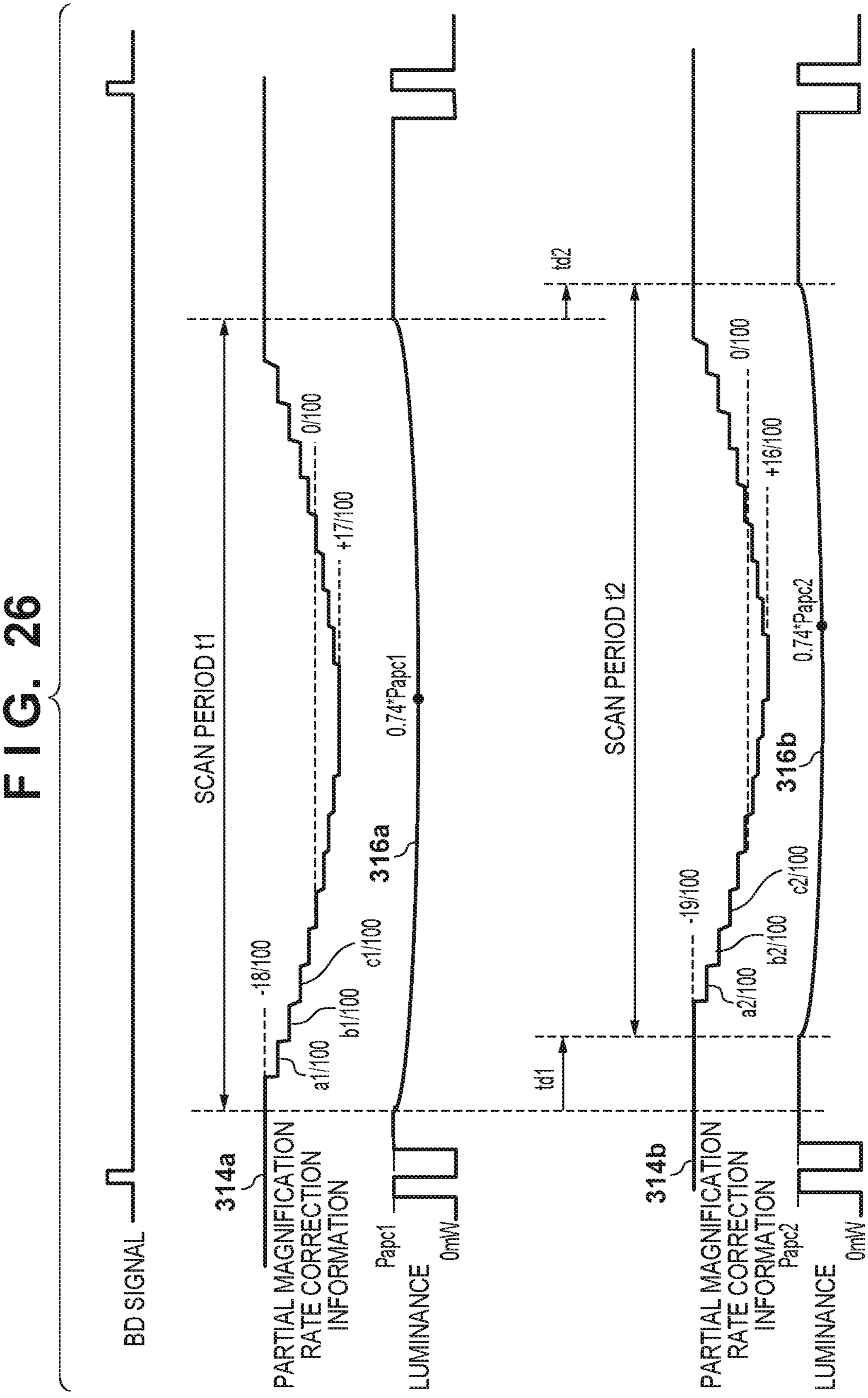
FIG. 26 is a timing chart of partial magnification rate correction and luminance correction according to an embodiment.

Note that in the configurations of FIG. 10 to FIG. 12 and FIG. 18, the shared luminance correction information 315 is used for the scan beam 208*a* and the scan beam 208*b*. However, it is also possible to use discrete pieces of luminance correction information 315 for the scan beam 208*a* and the scan beam 208*b*. FIG. 26 shows a timing chart for a case where discrete pieces of partial magnification rate correction information 314 and discrete pieces of luminance correction information 315 are used for the scan beam 208*a* and the scan beam 208*b*. Note that it is also possible to use the shared partial magnification rate correction information 314 and discrete pieces of luminance correction information 315 for the scan beam 208*a* and the scan beam 208*b*.

Figure 28:
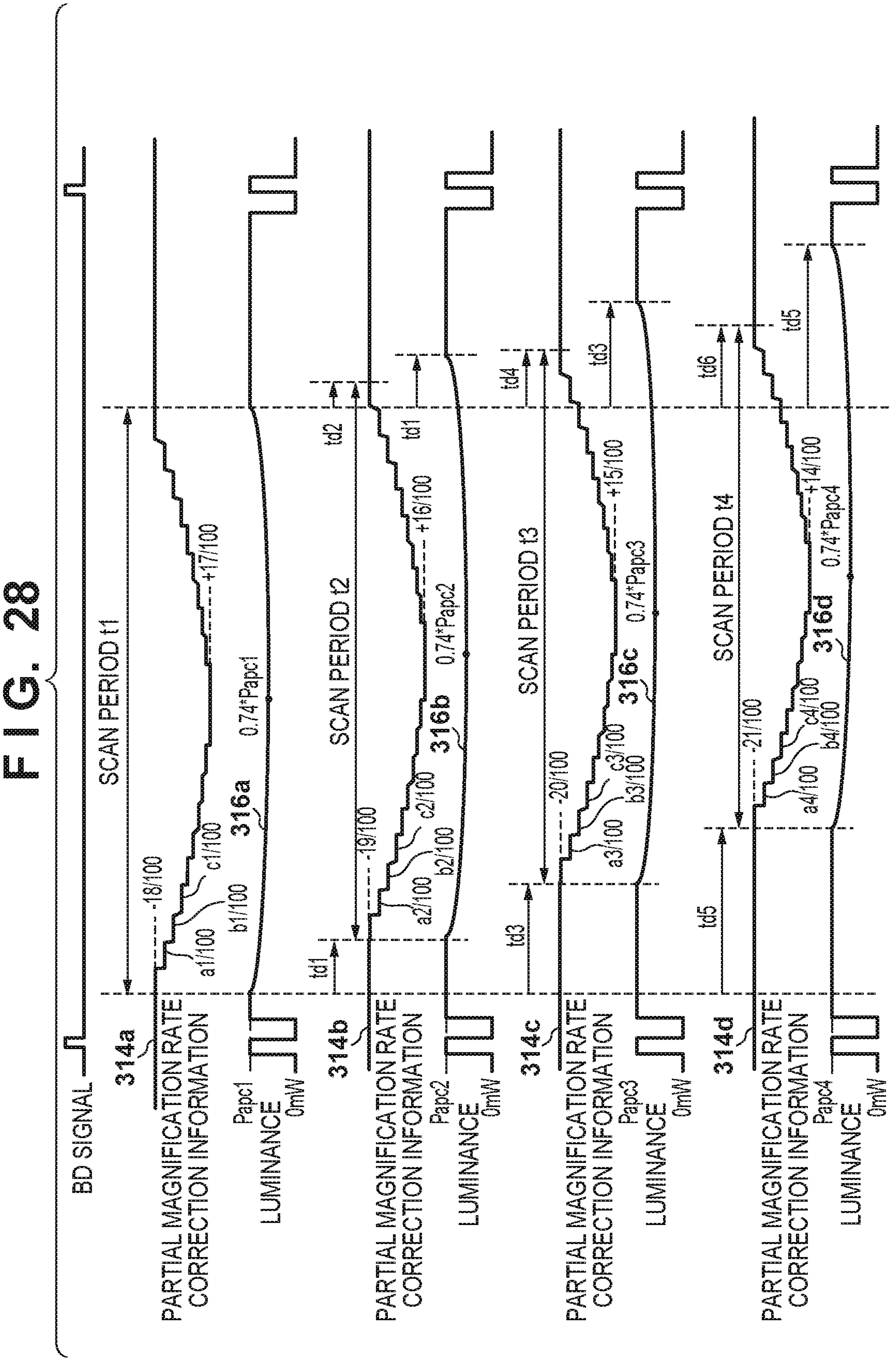
FIG. 28 is a timing chart of partial magnification rate correction and luminance correction according to an embodiment.
Figure 29:
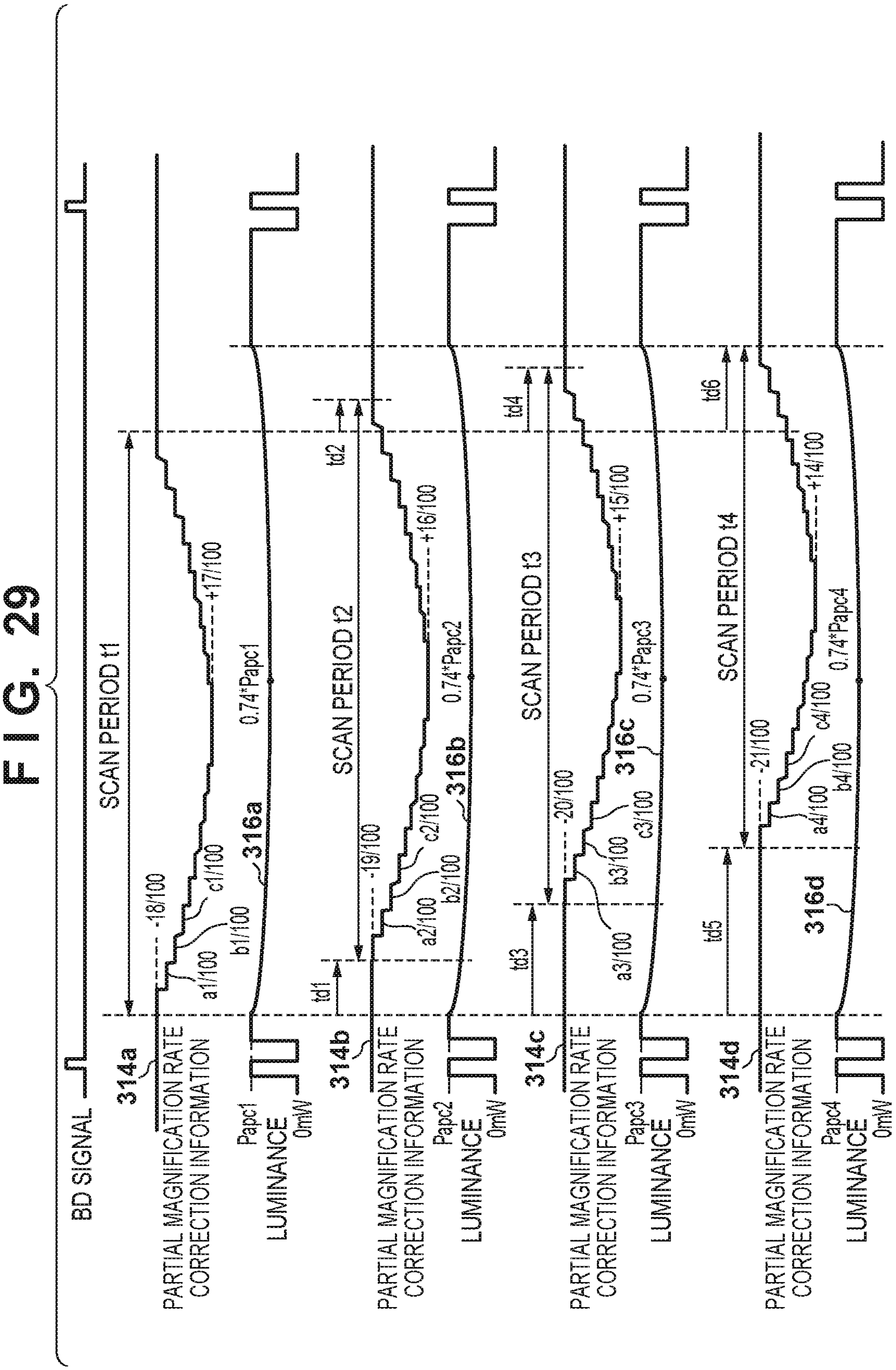
FIG. 29 is a timing chart of partial magnification rate correction and luminance correction according to an embodiment.

Furthermore, while two scan beams are used in the present embodiment, the number of scan beams can be any number equal to or larger than two. FIG. 28 shows a case where discrete pieces of partial magnification rate correction information 314*a* to 314*d* and the shared luminance correction information 315 are used for four scan beams. Note that reference signs 316*a* to 316*d* indicate the changes in the luminance of the four scan beams, respectively. Furthermore, FIG. 29 shows a case where shared luminance correction is performed with respect to each of the four scan beams in the configuration of FIG. 28.

Note that it is permissible to adopt a configuration in which, even in a case where discrete pieces of partial magnification rate correction information 314 are used in the partial magnification rate correction for the scans that are respectively performed by a plurality of scan beams, each piece of partial magnification rate correction information 314 indicates the same ranges of sections in the main scanning direction. The characteristics of partial magnification rates are represented by a curved line; in contrast, the amount of inserted or removed pixel pieces in a section indicated by the partial magnification rate correction information 314 is constant. Therefore, a boundary between two neighboring sections exhibits a change in the amount of insertion or removal. Even in a case where discrete pieces of partial magnification rate correction information 314 are used, using the same sections, and thereby causing the positions of change in the amount of insertion or removal to be uniform on each scan line, can suppress relative errors in pixel positions among scan lines, maintain the image quality, and reduce interference fringes.

Figure 13A:
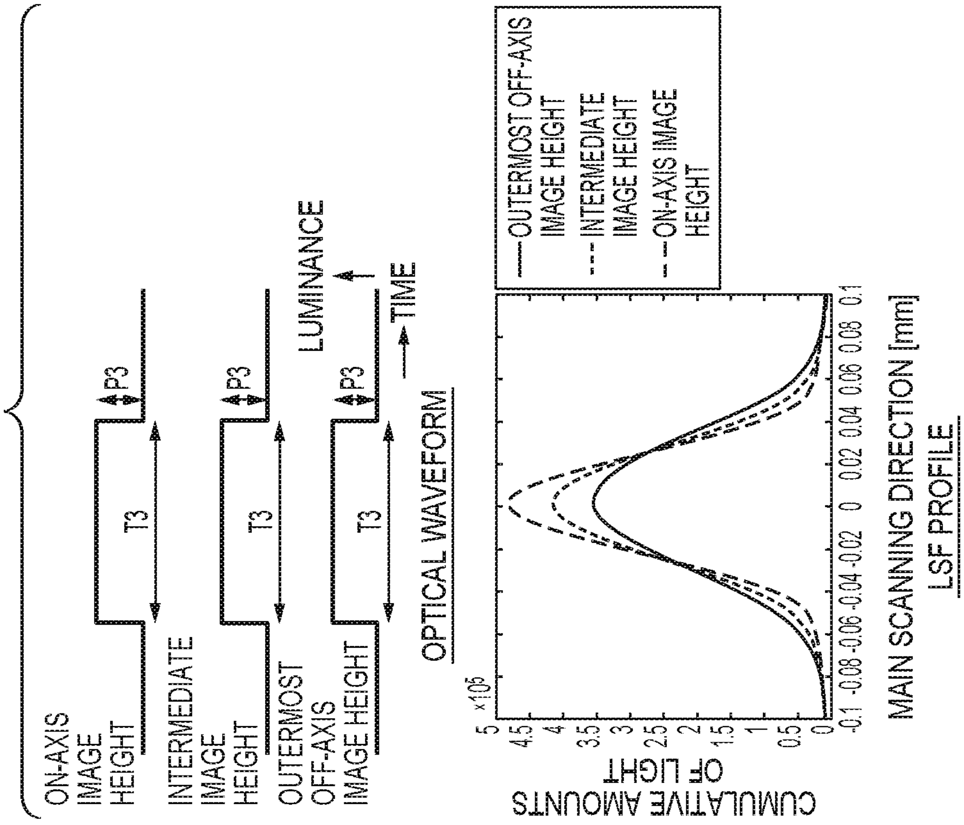
FIG. 13A to FIG. 13C are diagrams showing optical waveforms and LSF profiles in a main scanning direction.
Figure 13B:
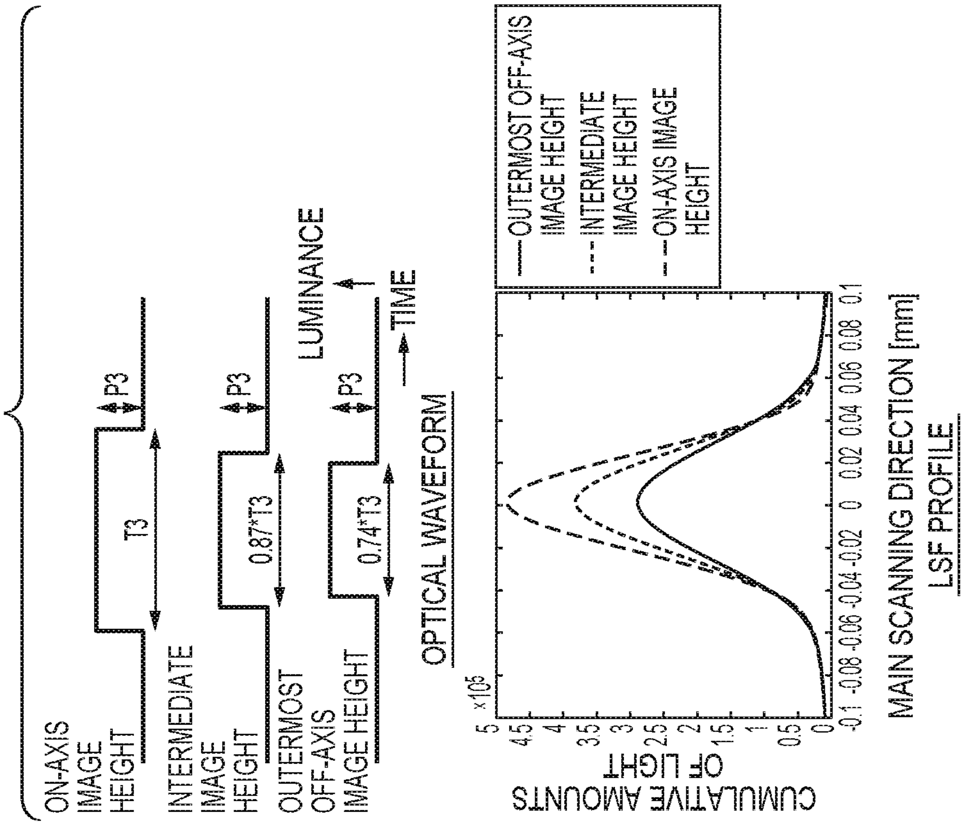
Figure 13C:
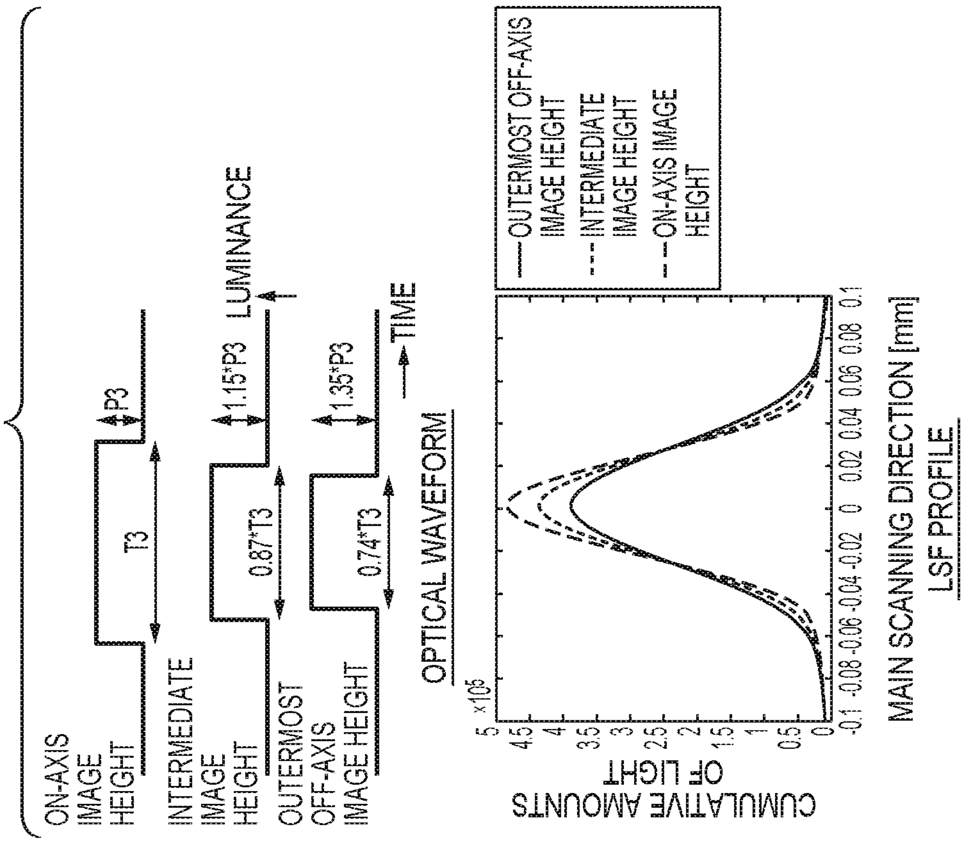

FIG. 13A to FIG. 13C show optical waveforms and LSF (Line Spread Function) profiles in the main scanning direction. Note that in connection with the optical waveforms, a period for which the light sources 410 emitted light for exposing one pixel to light, as well as the luminance thereof, is shown. An LSF profile is obtained by integrating, in the sub scanning direction, profiles of spots that have been formed on the photosensitive member 4 for exposing one pixel to light, and indicates the total amount of light exposure (the amount of integrated light) for the photosensitive member 4. Note that each of FIG. 13A to FIG. 13C shows LSF profiles corresponding to the on-axis image height, the intermediate image height, and the outermost off-axis image height. The intermediate image height mentioned here denotes the image height that is intermediate between the on-axis image height and the outermost off-axis image height.

FIG. 13A shows a case where the partial magnification rate correction and the luminance correction are not performed. As shown in FIG. 13A, in a case where the partial magnification rate correction and the luminance correction are not performed, the LSF profiles broaden and the peaks of the cumulative amounts of light decrease with a shift from the on-axis image height to the off-axis image height.

FIG. 13B shows a case where only the partial magnification rate correction is performed, and the luminance correction is not performed. As shown in FIG. 13B, broadening of the LSF profiles with a shift from the on-axis image height to the off-axis image height is suppressed. However, the decrease in the peaks of the cumulative amounts of light caused by the image height approaching the outermost off-axis image height is more significant than that of FIG. 13A.

FIG. 13C shows a case where the aforementioned partial magnification rate correction and luminance correction have been performed. As the luminance correction has been performed, the decrease in the peaks of the cumulative amounts of light in the LSF profiles is suppressed, and broadening of the LSF profiles is also suppressed. Although the LSF profiles corresponding to the on-axis image height, the intermediate image height, and the outermost off-axis image height in FIG. 13C are not the same, the total amount of light exposure for each pixel is substantially the same therein; the correction has been performed at a level where the formed image receives no influence.

As described above, in the present embodiment, for each of the scans that are respectively performed by a plurality of light sources, the partial magnification rate correction and the luminance correction are performed with respect to each of the scans that are respectively performed by the light sources. Note that it is permissible to adopt a configuration that uses different (discrete) pieces of partial magnification rate correction information 314 and the same (shared) luminance correction information 315 in the scans that are respectively performed by the plurality of light sources. Furthermore, it is also permissible to adopt a configuration that uses the same partial magnification rate correction information 314, or adopt a configuration that uses discrete pieces of luminance correction information 315, in the scans that are respectively performed by the plurality of light sources. Moreover, in a case where the same luminance correction information is used, the luminance correction for each of the plurality of scan beams can be started from a timing when the scan beam arrived at a predetermined position (the scan start position) on the photosensitive member 4 in the main scanning direction. In addition, in a case where the luminance correction information 315 is used, the luminance correction for each of the plurality of scan beams can be started at a timing when one predetermined scan beam arrived at the predetermined position on the photosensitive member 4 in the main scanning direction. For example, a scan beam that arrives at this predetermined position on the photosensitive member 4 the earliest can be used as this one predetermined scan beam. The foregoing configuration makes it possible to perform exposure while suppressing image defect, even in a case where scanning is performed with a plurality of scan beams without using a scan lens with the fθ characteristics.

Note that according to the partial magnification rate correction information 314 shown in FIG. 9, pixel pieces are inserted in the vicinity of the on-axis image height, and pixel pieces are removed in the vicinity of the outermost off-axis image height. However, it is also permissible to adopt a configuration in which the amount of inserted or removed pixel pieces at the on-axis image height is set at 0, and the amount of removed pixel pieces increases toward the outermost off-axis image height. Conversely, it is also permissible to adopt a configuration in which the amount of inserted or removed pixel pieces at the outermost off-axis image height is set at 0, and the amount of inserted pixel pieces increases toward the on-axis image height. Note that the smaller the maximum value of the absolute values of the amounts of inserted or removed pixel pieces, the better the image quality.

Second Embodiment

Next, a second embodiment will be described with a focus on the differences from the first embodiment. In the present embodiment, density correction to be described below is performed instead of the luminance correction according to the first embodiment. The density correction is intended to correct the amount of light exposure for a pixel in accordance with the position of the pixel in the main scanning direction so that the density of the pixel formed on the photosensitive member becomes the density corresponding to the pixel value of the pixel.

In the present embodiment, as the luminance correction is not performed, the luminance correction information 315 according to the first embodiment is not stored in the memory 304 of the driving unit 300. Therefore, the current value of the current IL flowing through the light sources 410 is controlled to be constant during single scanning. On the other hand, in the present embodiment, as density control is performed, density correction information 319 is stored in the memory 304 of the driving unit 300. The density correction information 319 is information indicating a relationship between the position or section in the main scanning direction and the amount of correction of density. The amount of correction of density is set so that the lower the scan speed, the larger the amount of reduction in density. The CPU 2 of the IC 3 reads out the density correction information 319 stored in the memory 304, and outputs the same to the modulation unit 101. The density correction processing unit 121 performs density correction processing based on the density correction information 319. Specifically, it changes the pixel values (tone values) of pixels based on the density correction information.

Figure 14:
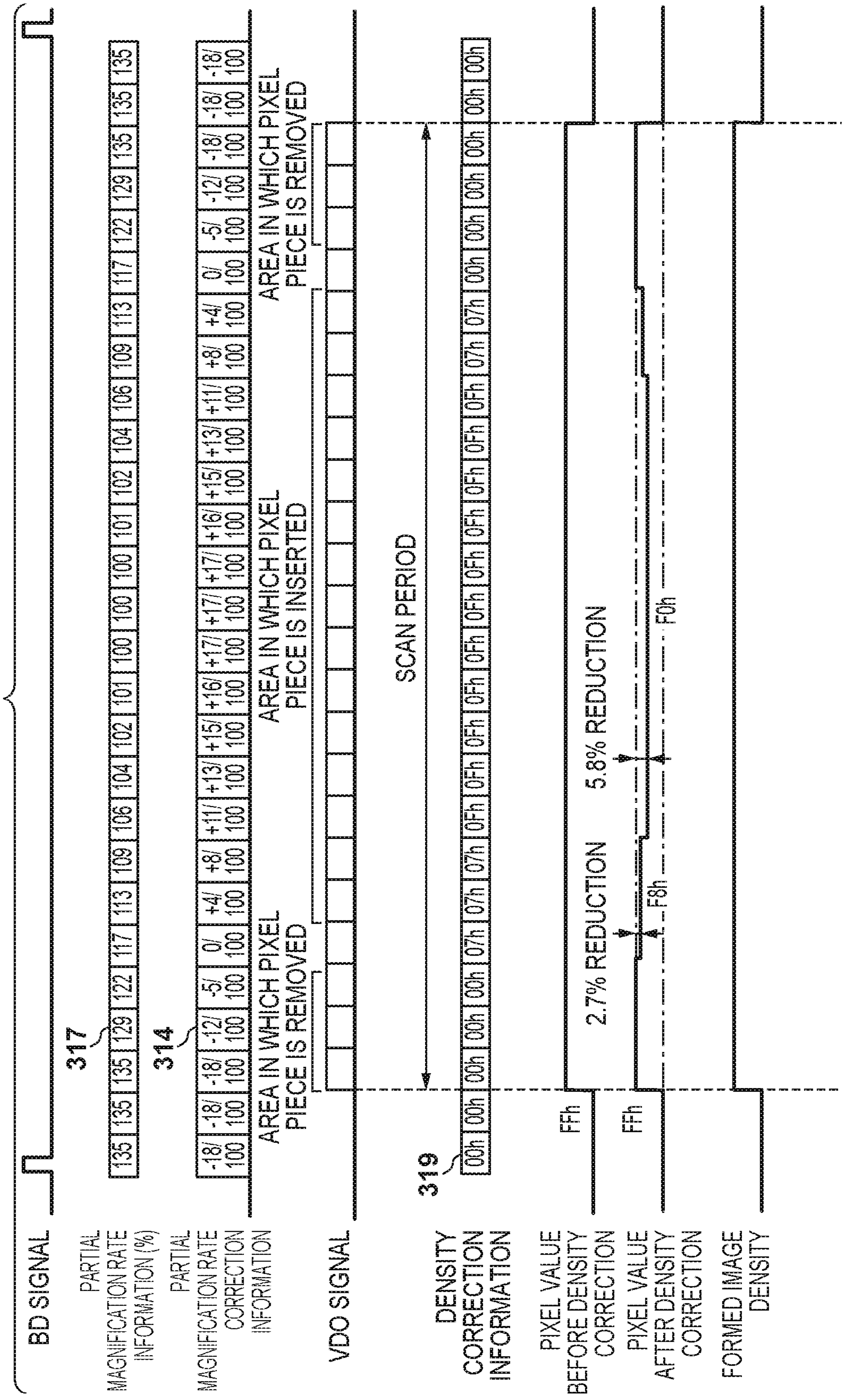
FIG. 14 is a timing chart of partial magnification rate correction and density correction.

FIG. 14 is a timing chart for describing partial magnification rate correction and density correction according to the present embodiment. Note that the partial magnification rate correction is similar to that of FIG. 9 according to the first embodiment. The density correction information 319 indicates the positions of pixels in the main scanning direction and the amounts of reduction in the pixel values of these pixels. Specifically, in FIG. 14, in a case where the correction value is "07h", the density correction processing unit 121 outputs a value obtained by subtracting 7 from the pixel value before the density correction, and in a case where the correction value is "0Fh", it outputs a value obtained by subtracting 15 from the pixel value before the density correction. Note that "a pixel value before the density correction" means an output pixel value indicated by the density correction table. That is to say, the density correction processing unit 121 converts an input pixel value into an output pixel value based on the density correction table, and corrects the output pixel value based on the density correction information 319. As shown in FIG. 14, in a case where the pixel value before the density correction is 255 (FFh), the pixel value of a pixel in the vicinity of the on-axis image height output from the density correction processing unit 121 is 240 (F0h). Therefore, the amount of reduction in density is 15/255≈5.8%. According to the density correction information 319 of FIG. 14, density is not reduced at the outermost off-axis image height, and density is reduced by approximately 5.8% at the on-axis image height. In a case where the density correction is not performed when the scan speed at the outermost off-axis image height is 135% of the scan speed at the on-axis image height, the image density at the on-axis image height does not necessarily become 135% of the image density at the outermost off-axis image height. This is because, due to the exposure sensitivity characteristics of the photosensitive member 4 and the toner development characteristics, the relationship between the total amount of light exposure per unit area of the photosensitive member 4 and the toner density of an image that is ultimately formed is not linear. The density correction information 319 is set in consideration of the foregoing.

Figure 15:
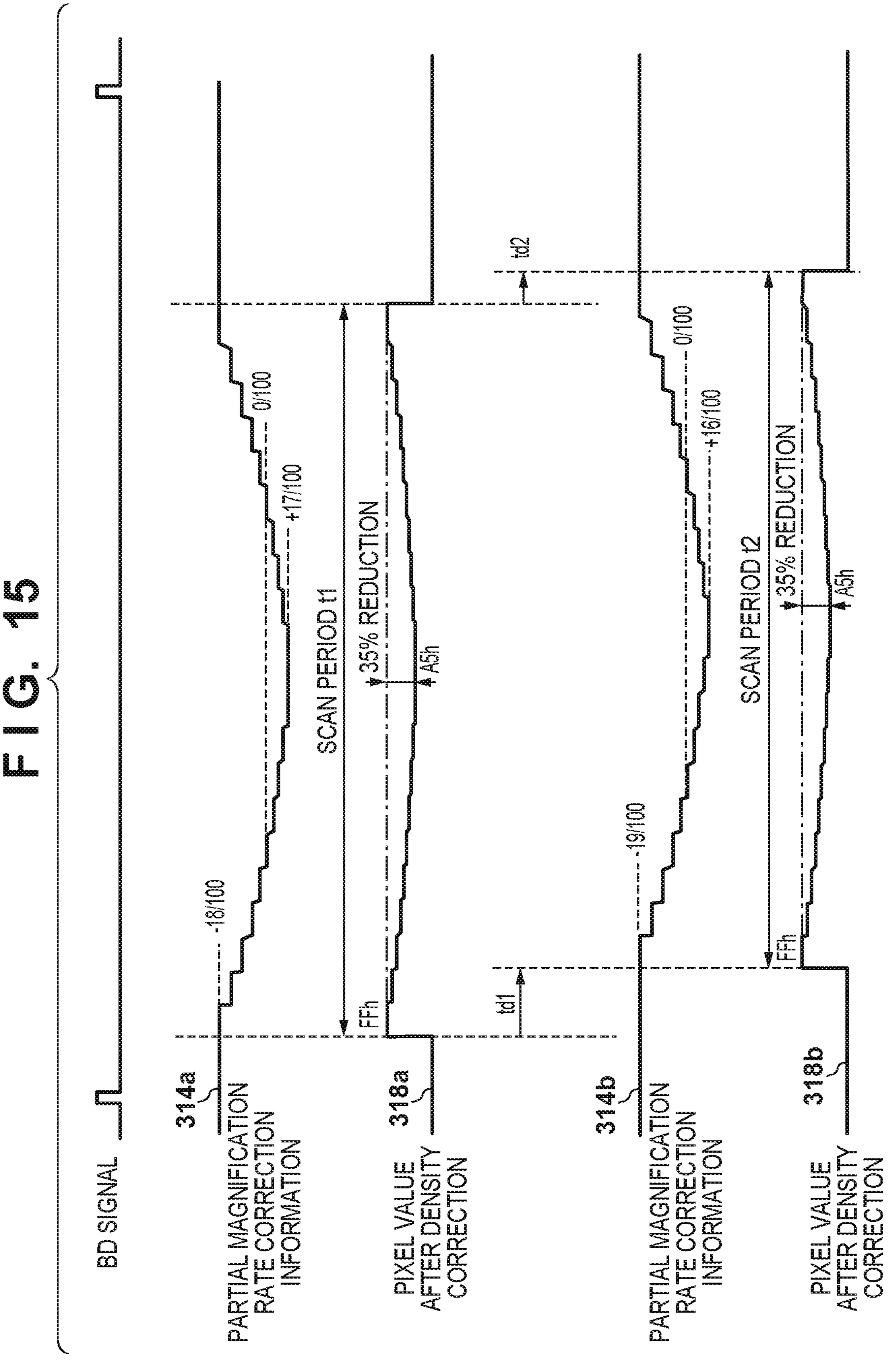
FIG. 15 is a timing chart of partial magnification rate correction and density correction according to an embodiment.

FIG. 15 shows a timing chart for a case where the partial magnification rate correction related to scanning by the scan beams 208*a* and 208*b* is performed using discrete pieces of partial magnification rate correction information 314. Note that the pieces of partial magnification rate correction information 314*a* and 314*b* are similar to those of FIG. 10 according to the first embodiment. The density correction information 319 indicates a relationship between the position or section of a pixel in the main scanning direction and the amount of correction of the pixel value (tone value); there is one piece of density correction information regardless of the number of scan beams used. In FIG. 15, reference sign 318*a* indicates a relationship between a pixel value after the density correction performed for the generation of VDO #a and a section, whereas reference sign 318*b* indicates a relationship between a pixel value after the density correction performed for the generation of VDO #b and a section. Note that the pixel value before the density correction is 255 (FFh).

Figure 19:
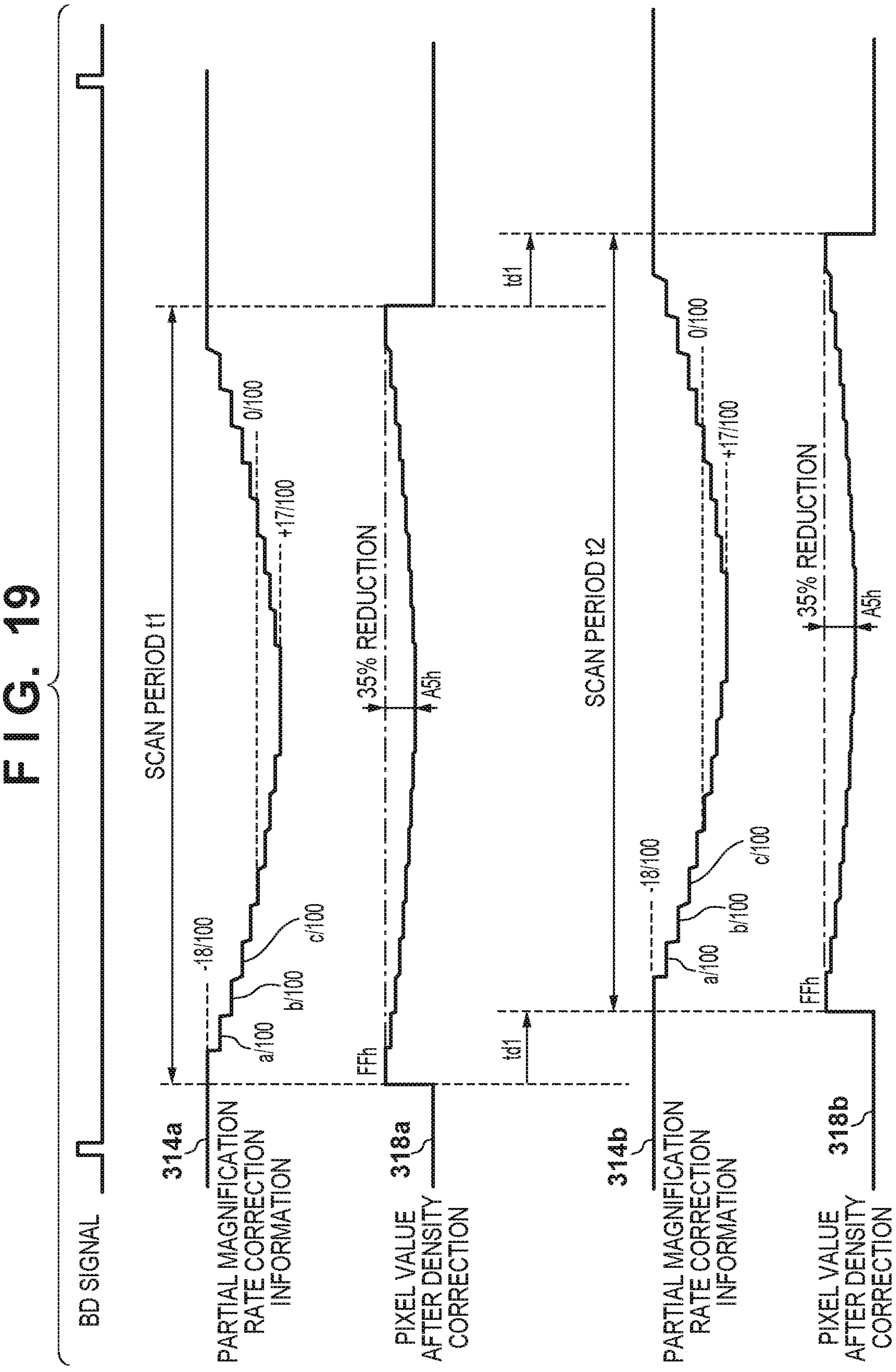
FIG. 19 is a timing chart of partial magnification rate correction and density correction according to an embodiment.
Figure 30:
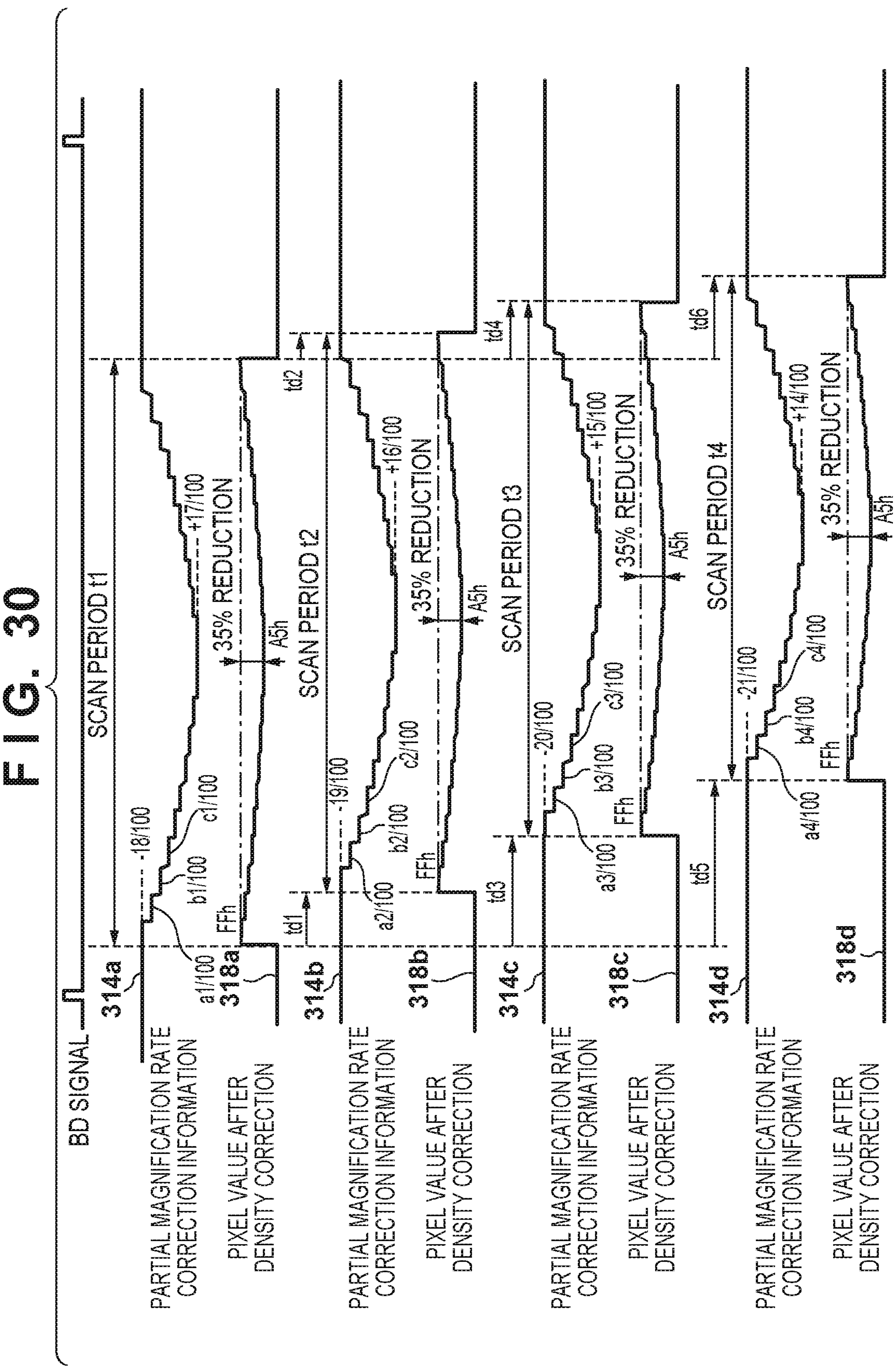
FIG. 30 is a timing chart of partial magnification rate correction and density correction according to an embodiment.

FIG. 19 is a timing chart for a case where shared partial magnification rate correction information 314 and one piece of density correction information 319 are used. Furthermore, FIG. 30 shows a case where there are four scan beams; here, discrete pieces of partial magnification rate correction information 314 are used, similarly to FIG. 28.

As described above, according to the present embodiment, electrical circuits for performing the luminance correction of FIG. 9, such as the DACs 21, REGs 22, and VI conversion circuits 306, are unnecessary, and the cost can be reduced.

Third Embodiment

Next, a third embodiment will be described with a focus on the differences from the first embodiment and the second embodiment. In the first embodiment and the second embodiment, the partial magnification rate correction is performed by inserting or removing pixel pieces. In the present embodiment, the partial magnification rate correction is performed by changing the frequency of image signals, rather than by inserting or removing pixel pieces. Therefore, in the present embodiment, the pixel piece insertion and removal unit 128 of FIG. 7 is omitted. Furthermore, instead of the partial magnification rate information 317 and the partial magnification rate correction information 314 according to the first embodiment and the second embodiment, frequency correction information is stored in the memory 304 in advance.

Figure 16:
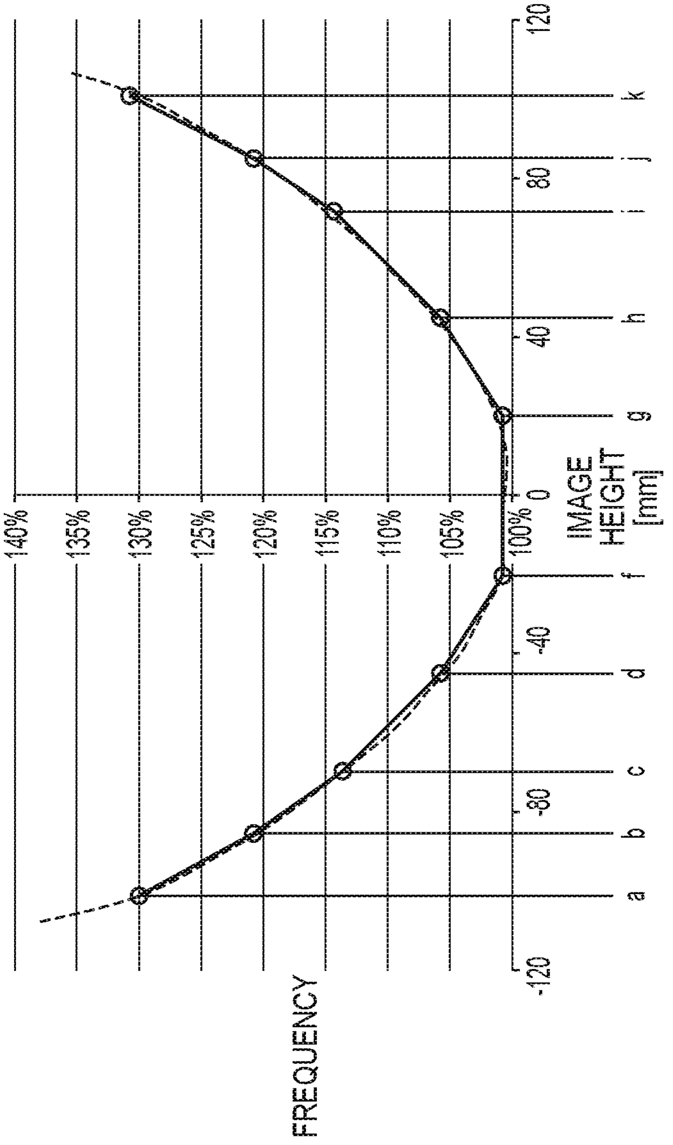
FIG. 16 is a diagram illustrating frequency correction information according to an embodiment.
Figure 34:
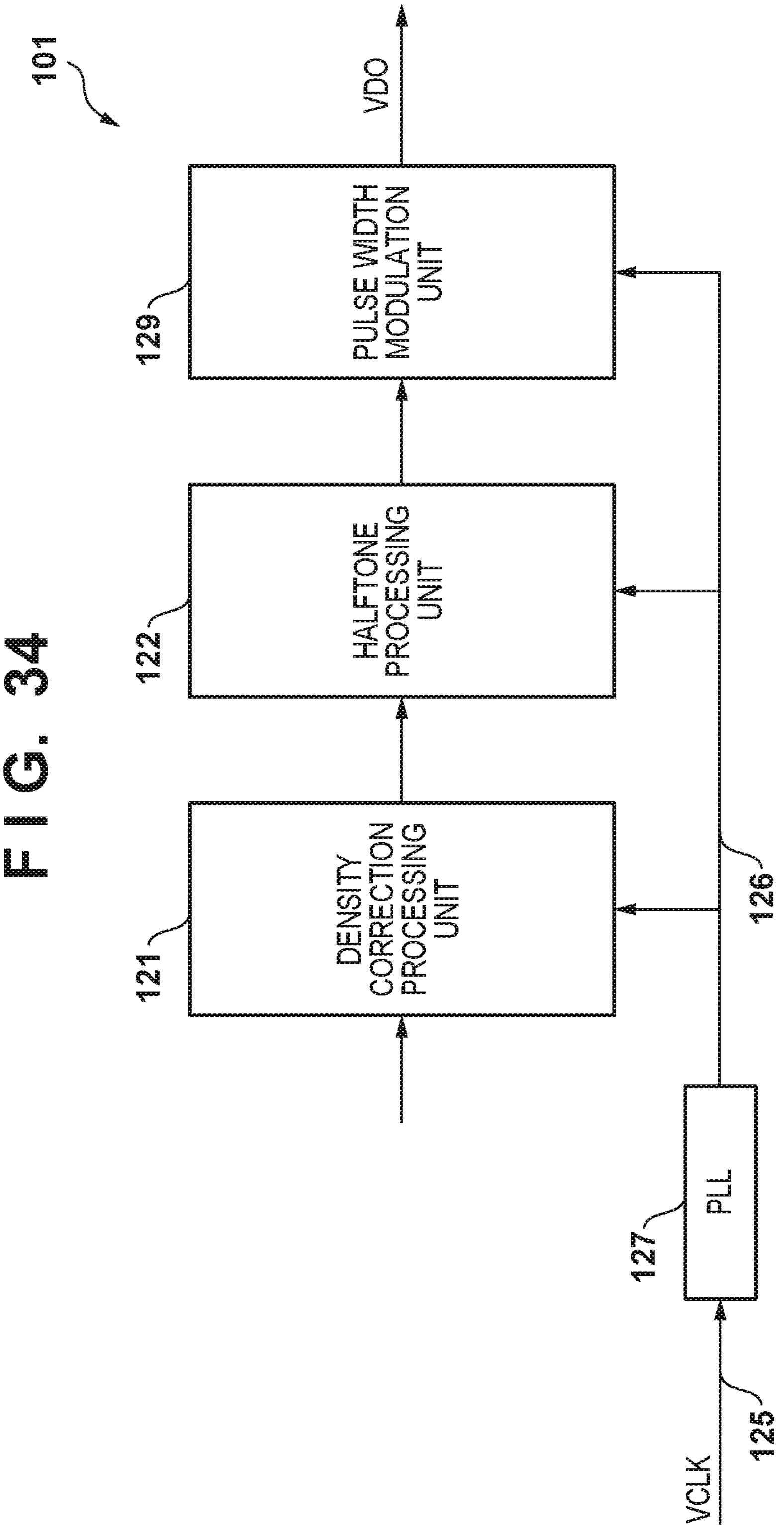
FIG. 34 is a block diagram of a modulation unit according to an embodiment.

FIG. 16 is a diagram illustrating the frequency correction information. Note that in FIG. 16, the frequency at each image height is denoted by a percentage relative to the frequency at the on-axis image height. In the example of FIG. 16, the main scanning direction is divided into nine sections. The characters "a" to "k" in FIG. 16 represent positions in the main scanning direction that serve as end portions of the respective sections. With respect to a position in the main scanning direction that serves as an end portion of each section, an ideal frequency for correcting the partial magnification rate at that position is set. As described above, the frequency correction information is information indicating the positions of end portions of the respective sections in the main scanning direction, as well as the frequencies at these positions of the end portions. FIG. 34 shows an example of a modulation unit 101 according to the present embodiment. When a scan beam exposes the position of an end portion of each section to light, a PLL 127 generates an image clock 126 based on a VCLK 125 so as to achieve the frequency indicated by the frequency correction information. On the other hand, when exposing a position in a section other than the positions of the end portions, the modulation unit 101 sequentially changes a parameter given to the PLL 127 so that the frequency of the image clock 126 becomes the frequency derived by performing linear interpolation with respect to the frequencies of the positions of the two end portions of this section. A pulse width modulation unit 129 generates a pulse width modulation signal corresponding to an input pixel value, and transmits the same as a VDO signal to the driving unit 300 of the optical scanning apparatus 400. For example, in a case where the image clock is 10 MHz (a cycle of 100 nS), a signal with a pulse width of 100 nS is generated when the pixel value is FFh, and a signal with a pulse width of approximately 50 nS is generated when the pixel value is 80h. A solid line of FIG. 16 indicates a relationship between the position in the main scanning direction and the frequency of the image clock 126 generated by the modulation unit 101, that is to say, the frequency of a VDO signal. Note that a dash line of FIG. 16 indicates an ideal relationship, for correcting the partial magnification rate, between the position in the main scanning direction and the frequency of a VDO signal. Controlling the frequency of image signals in accordance with the partial magnification rate, that is to say, the scan speed, makes it possible to suppress fluctuations in a pixel width caused by fluctuations in the scan speed.

Figure 17:
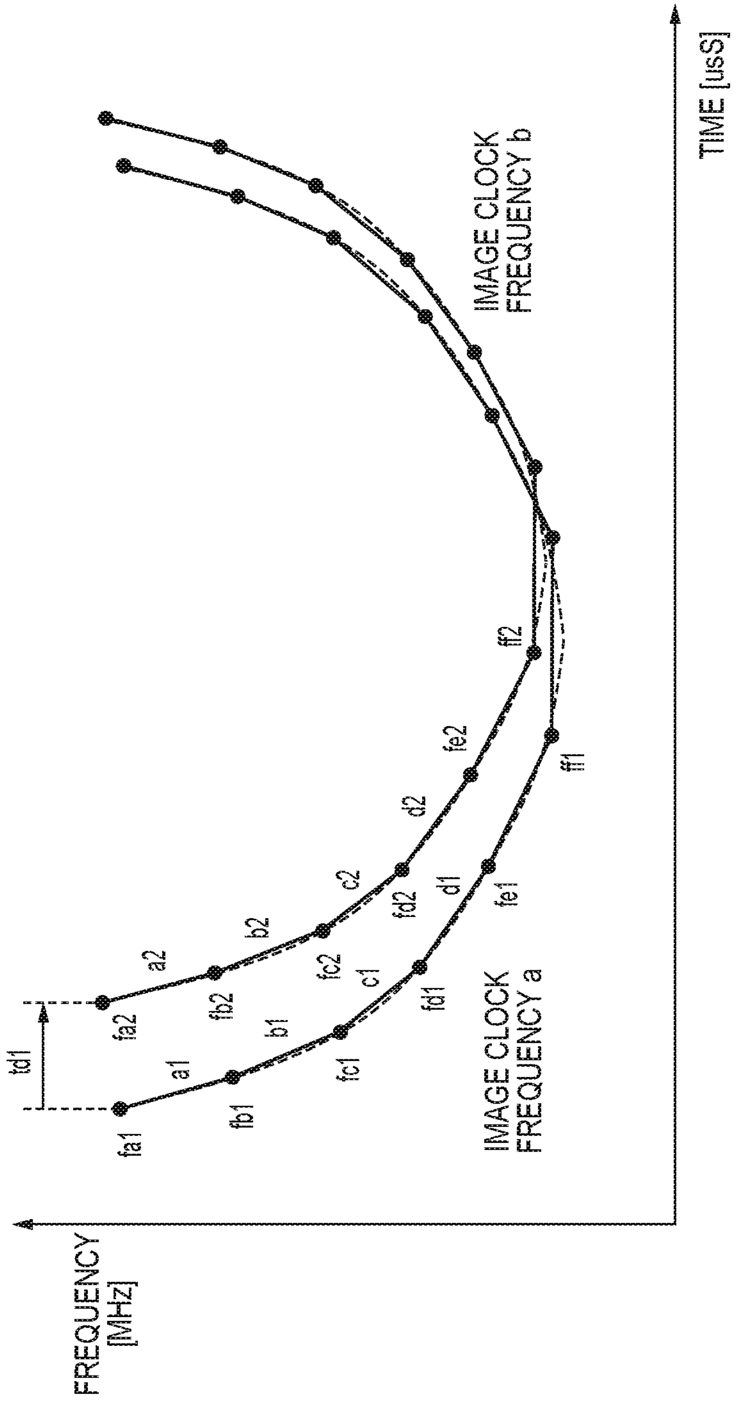
FIG. 17 is a diagram illustrating frequency correction information according to an embodiment.

Note that while the frequency correction information indicates the frequencies at end portions of the respective sections on the photosensitive member 4, it is permissible to adopt a configuration in which different pieces of frequency correction information indicate the same positions of end portions of the respective sections on the photosensitive member 4. FIG. 17 shows such pieces of frequency correction information a and frequency correction information b. The frequency correction information a is applied to VDO #a, whereas the frequency correction information b is applied to VDO #b. In FIG. 17, the frequencies indicated by the frequency correction information a are fa1, fb1, fc1, fd1, fe1, ff1, . . . , and the frequencies indicated by the frequency correction information b are fa2, fb2, fc2, fd2, fe2, ff2, . . . . According to the frequency correction information a, the frequency of VDO #a changes from the frequency fa1 to the frequency fb1 at an inclination a1, and then changes to the frequency fc1 at an inclination b1. On the other hand, according to the frequency correction information b, the frequency of VDO #b changes from the frequency fa2 to the frequency fb2 at an inclination a2, and then changes to the frequency fc2 at an inclination b2. The frequencies fa1 and fa2 are different from each other, and the frequencies fb1 and fb2 are different from each other; however, the position on the photosensitive member 4 at which the change in the frequency of VDO #a shifts from the inclination a1 to b1, is the same as the position on the photosensitive member 4 at which the change in the frequency of VDO #b shifts from the inclination a2 to b2. The positions on the photosensitive member 4 at which the change in the frequency shifts are the same among the plurality of scan beams; in this way, the number of circuits for generating the image clock, as well as relative differences in a device's response delay and a setting error, can be reduced, and the differences in the positions and lengths of pixels among the respective scan beams can be reduced.

Figure 20:
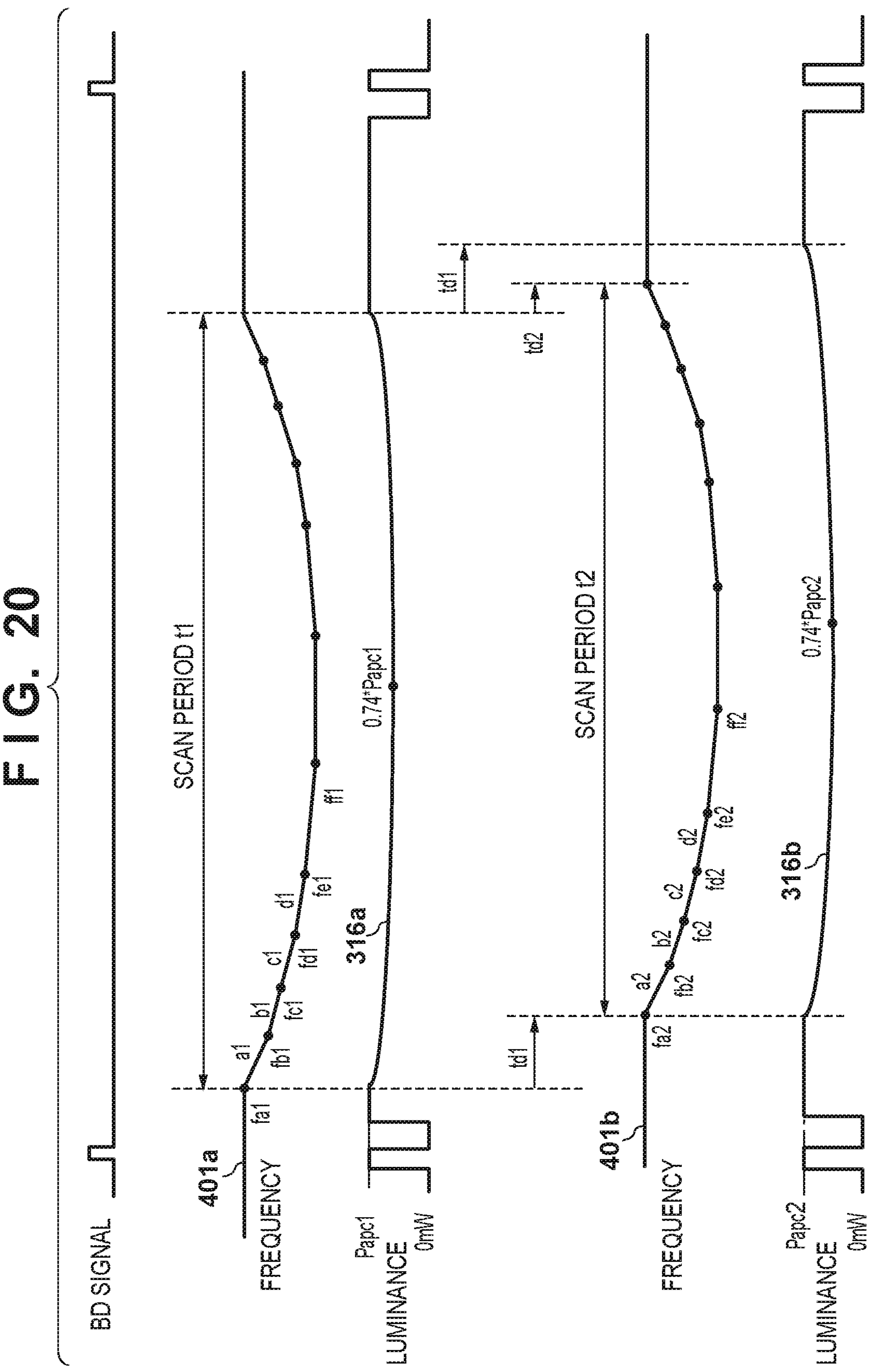
FIG. 20 is a timing chart of frequency correction and luminance correction according to an embodiment.
Figure 21:
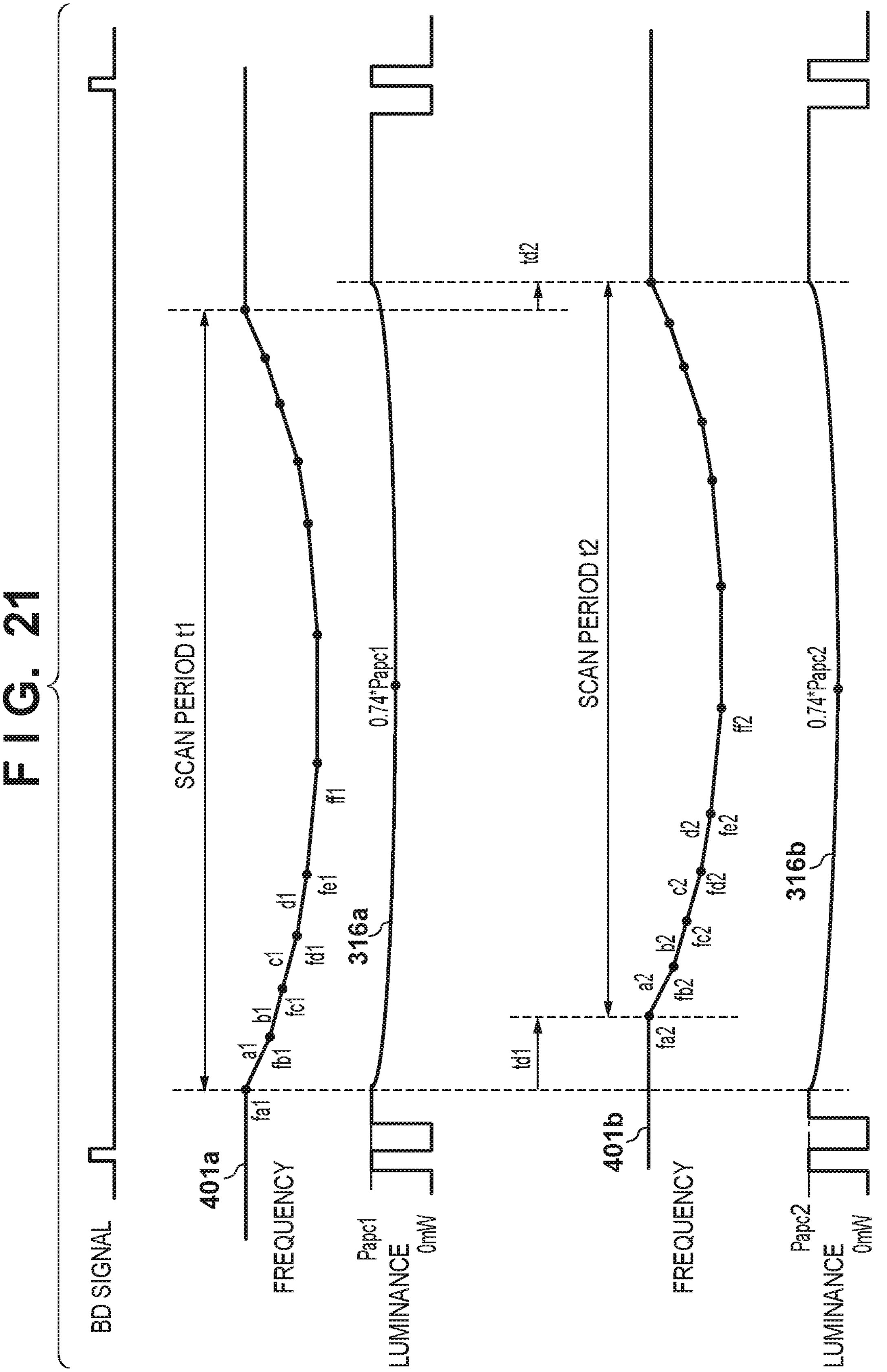
FIG. 21 is a timing chart of frequency correction and luminance correction according to an embodiment.

FIG. 20 shows a timing chart of frequency correction and luminance correction for a case where the scan beam 208*a* and the scan beam 208*b* are used. Note that the luminance correction is similar to that of FIG. 10. Also, in FIG. 20, the frequency correction information a shown in FIG. 17 is used in the luminance correction for VDO #a, and the frequency correction information b shown in FIG. 17 is used in the luminance correction for VDO #b. Reference signs 401*a* and 401*b* in FIG. 20 indicate the frequencies of VDO #a and VDO #b, respectively. In FIG. 21, shared luminance correction is performed with respect to the scan beam 208*a* and the scan beam 208*b*.

Figure 22:
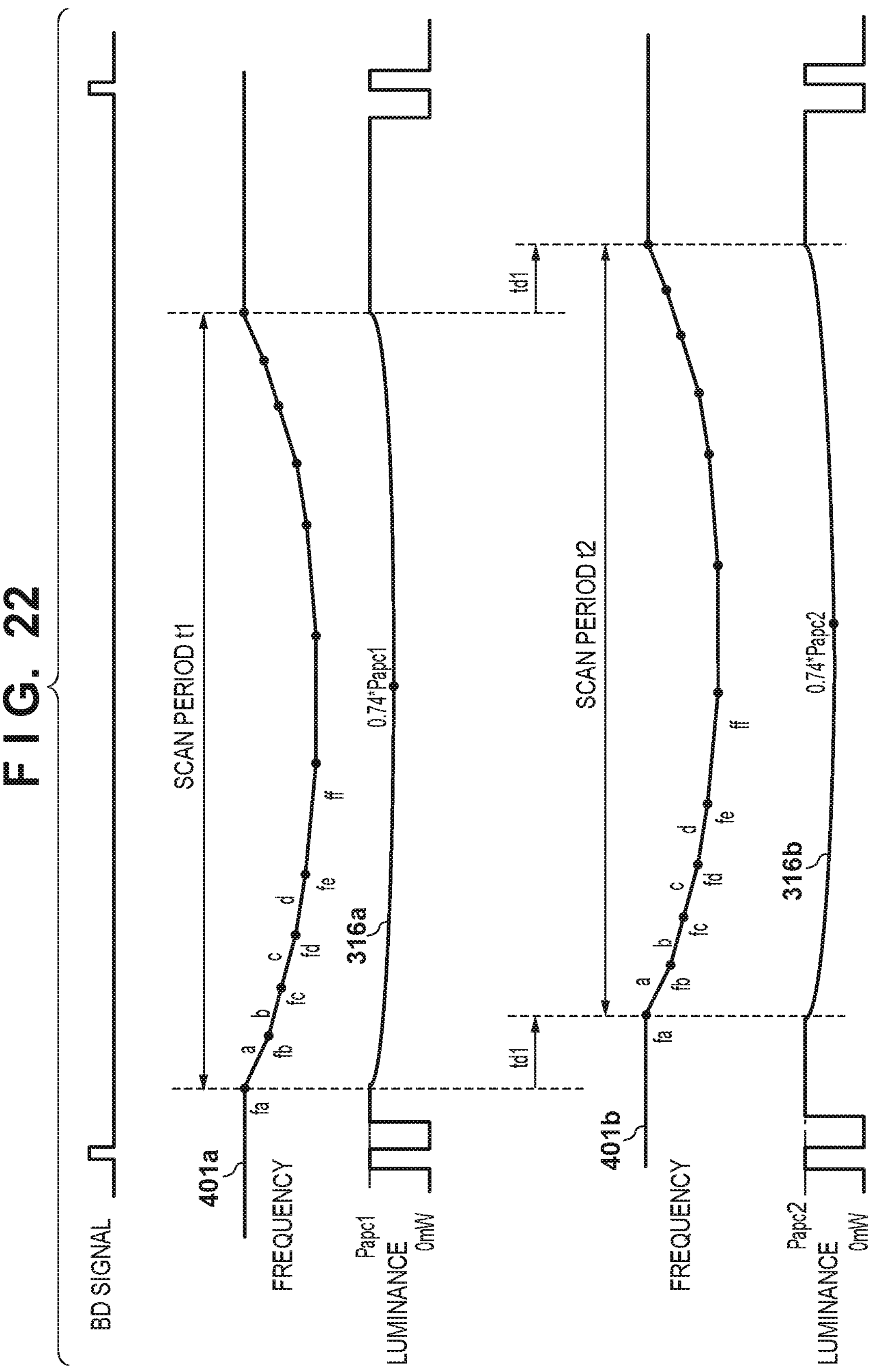
FIG. 22 is a timing chart of frequency correction and luminance correction according to an embodiment.
Figure 23:
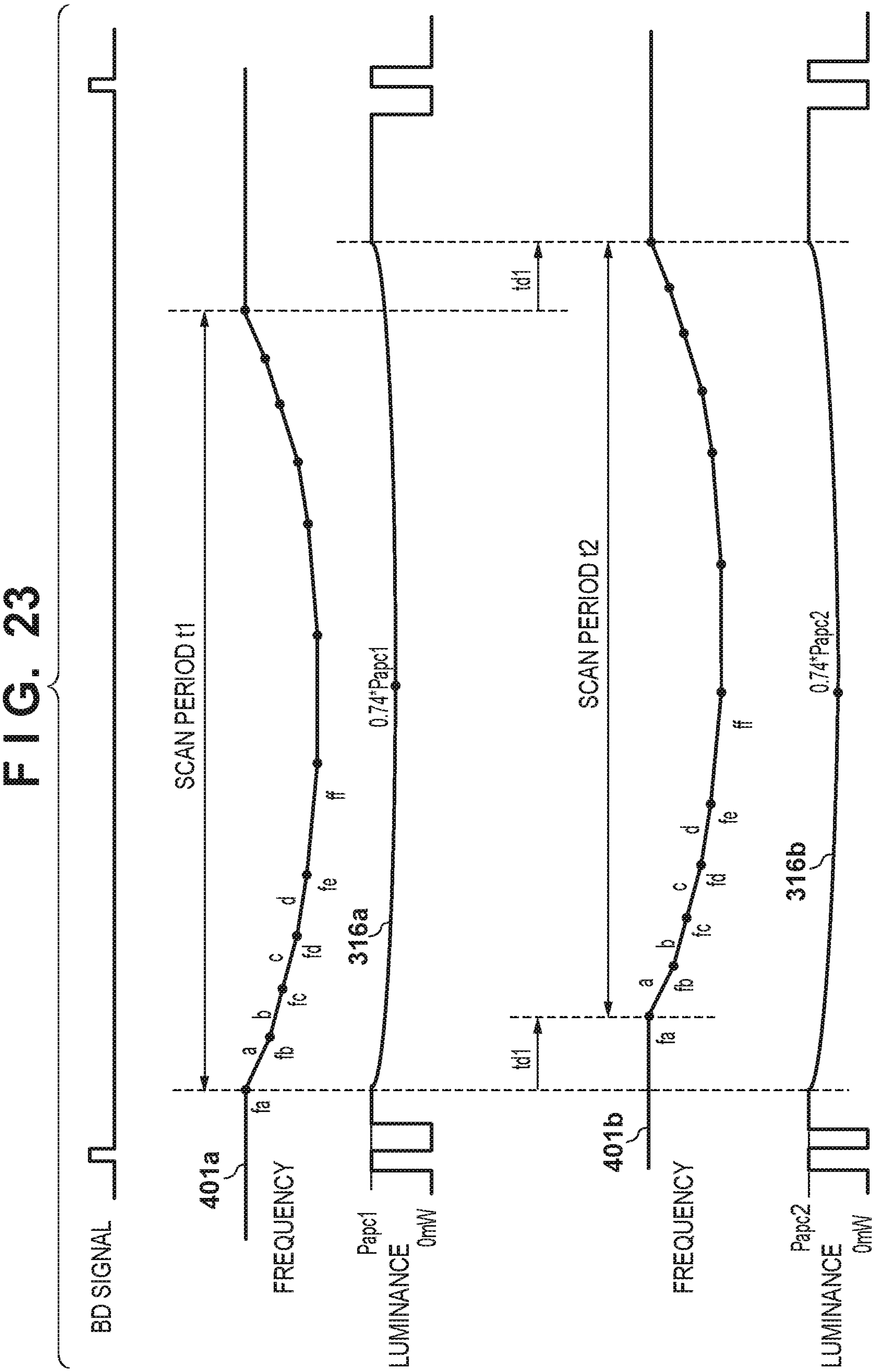
FIG. 23 is a timing chart of frequency correction and luminance correction according to an embodiment.

Note that although the frequency correction for VDO #a and VDO #b is performed using discrete pieces of frequency correction information in FIG. 20 and FIG. 21, shared frequency correction information can also be used. FIG. 22 and FIG. 23 show a case where the shared frequency correction information is used. Note that FIG. 22 shows a state where the timing to start the luminance correction differs between the scan beam 208*a* and the scan beam 208*b*, whereas FIG. 23 shows a state where shared luminance correction is performed with respect to the scan beam 208*a* and the scan beam 208*b*.

Figure 27:
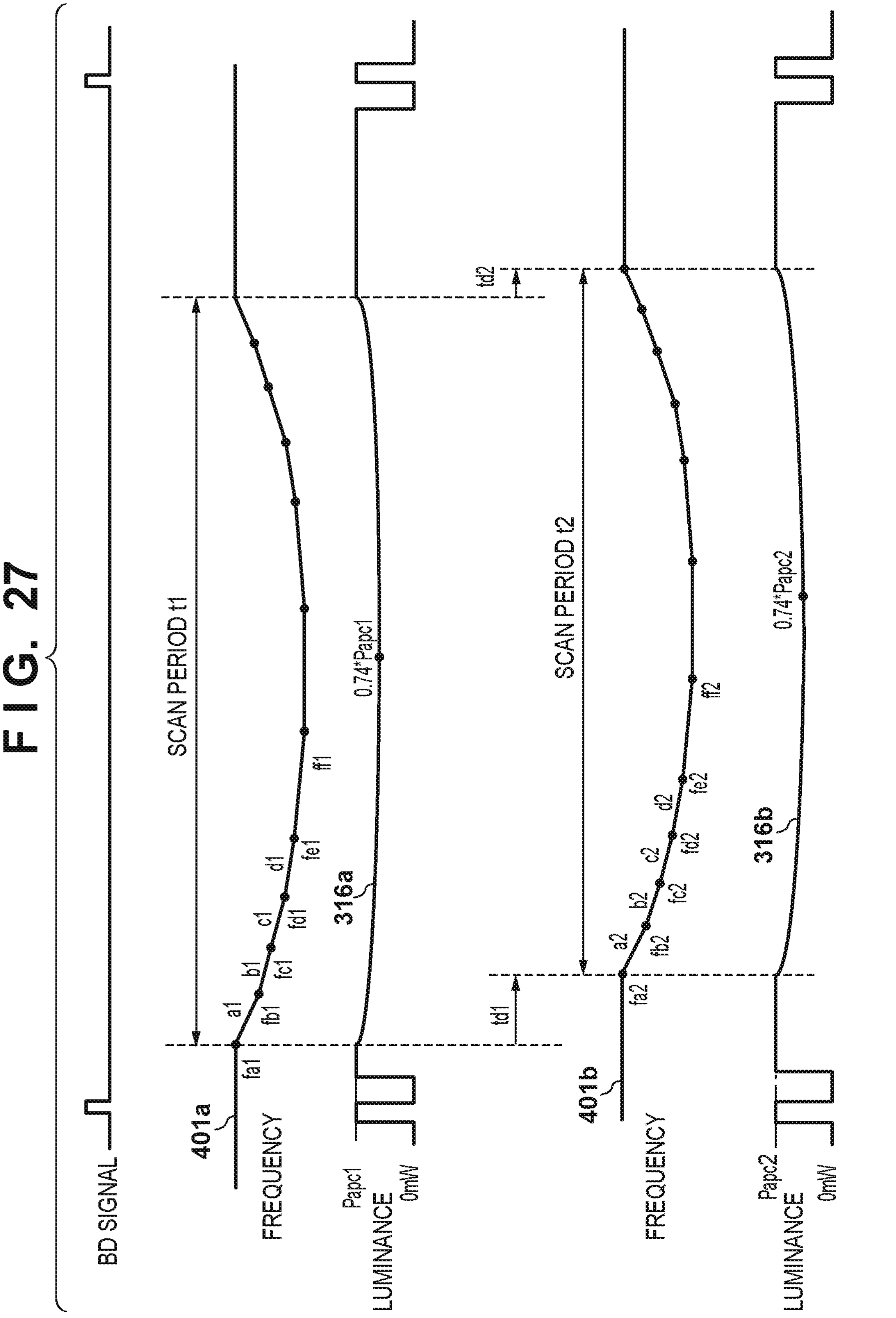
FIG. 27 is a timing chart of frequency correction and luminance correction according to an embodiment.

Furthermore, also in a case where the frequency correction and the luminance correction are performed, discrete pieces of luminance correction information 315 can be used with respect to the scan beams 208*a* and 208*b*, similarly to FIG. 26. FIG. 27 shows a case where discrete pieces of frequency correction information and discrete pieces of luminance correction information 315 are used. Furthermore, it is also possible to use shared frequency correction information and discrete pieces of luminance correction information 315.

Figure 31:
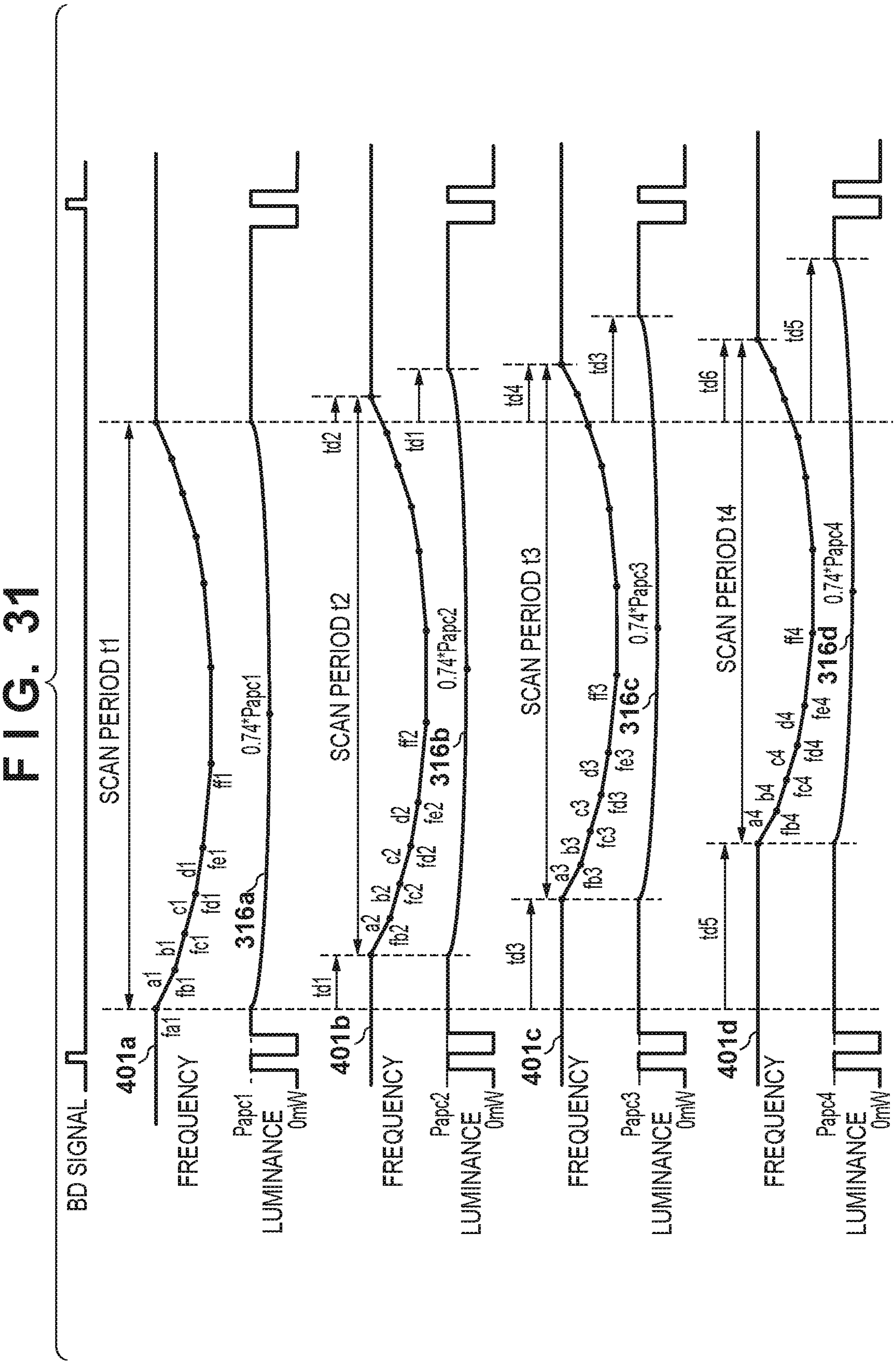
FIG. 31 is a timing chart of frequency correction and luminance correction according to an embodiment.
Figure 32:
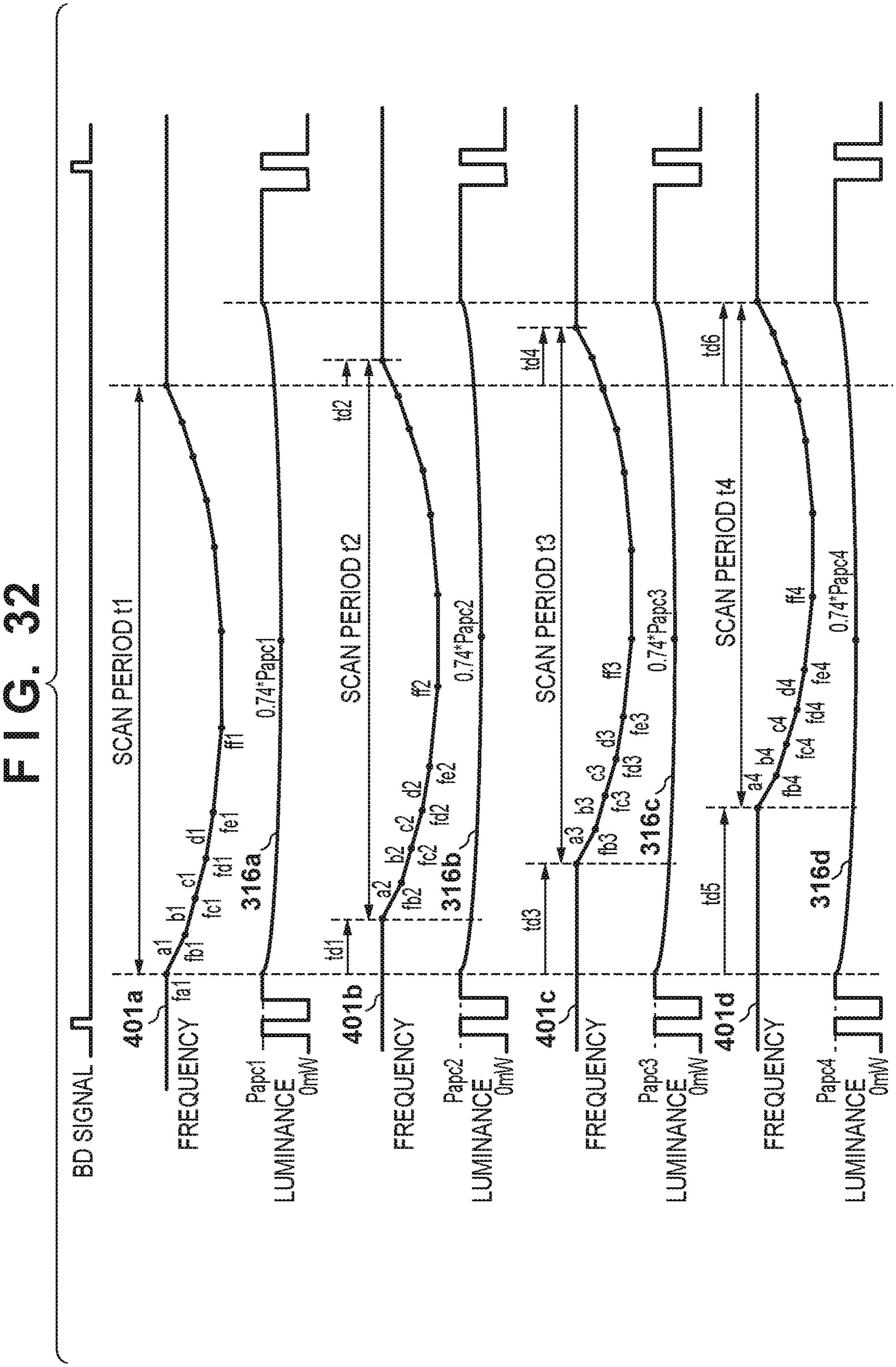
FIG. 32 is a timing chart of frequency correction and luminance correction according to an embodiment.

Moreover, as described earlier in connection with the first embodiment, the present embodiment, too, is applicable to an image forming apparatus that uses any number of scan beams that are equal to or larger than two in number. FIG. 31 shows a case where, when four scan beams are used, discrete pieces of frequency correction information and shared luminance correction information 315 are used in the frequency correction for each of four VDO signals. Note that reference signs 401*a* to 401*d* indicate the frequencies of the four VDO signals, respectively. Furthermore, FIG. 32 shows a case where shared luminance correction is performed with respect to the four scan beams.

Figure 24:
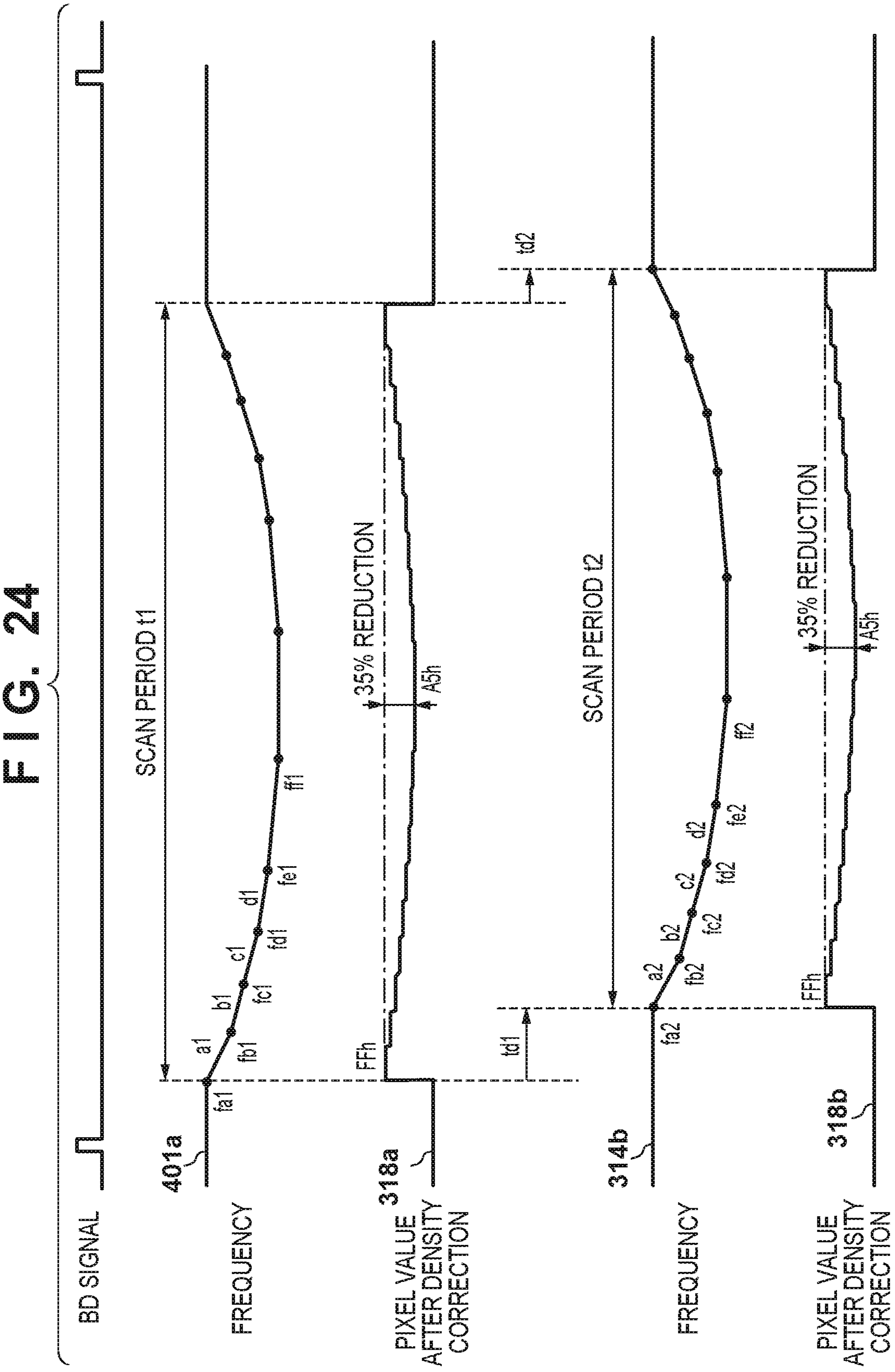
FIG. 24 is a timing chart of frequency correction and density correction according to an embodiment.
Figure 25:
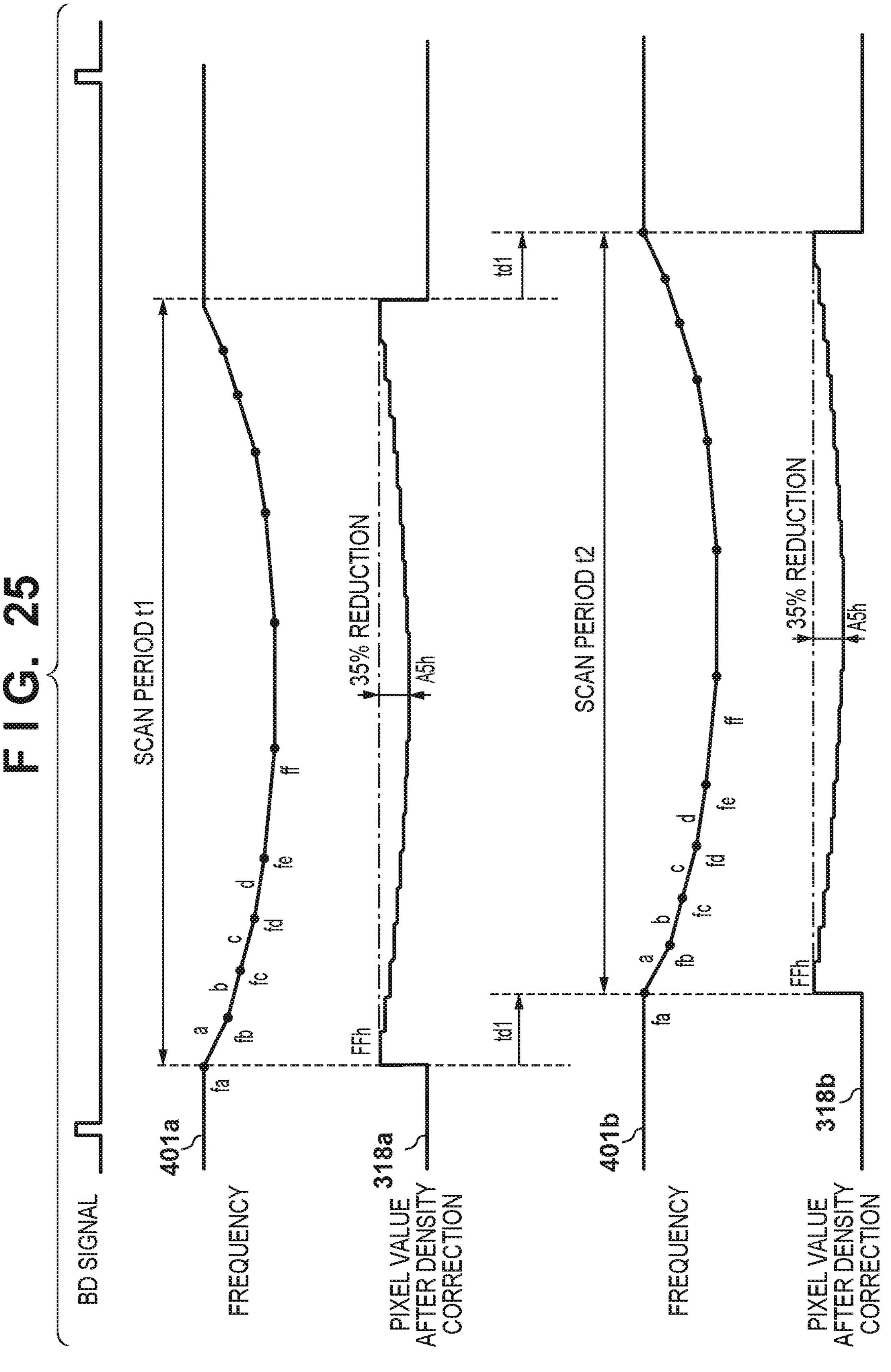
FIG. 25 is a timing chart of frequency correction and density correction according to an embodiment.
Figure 33:
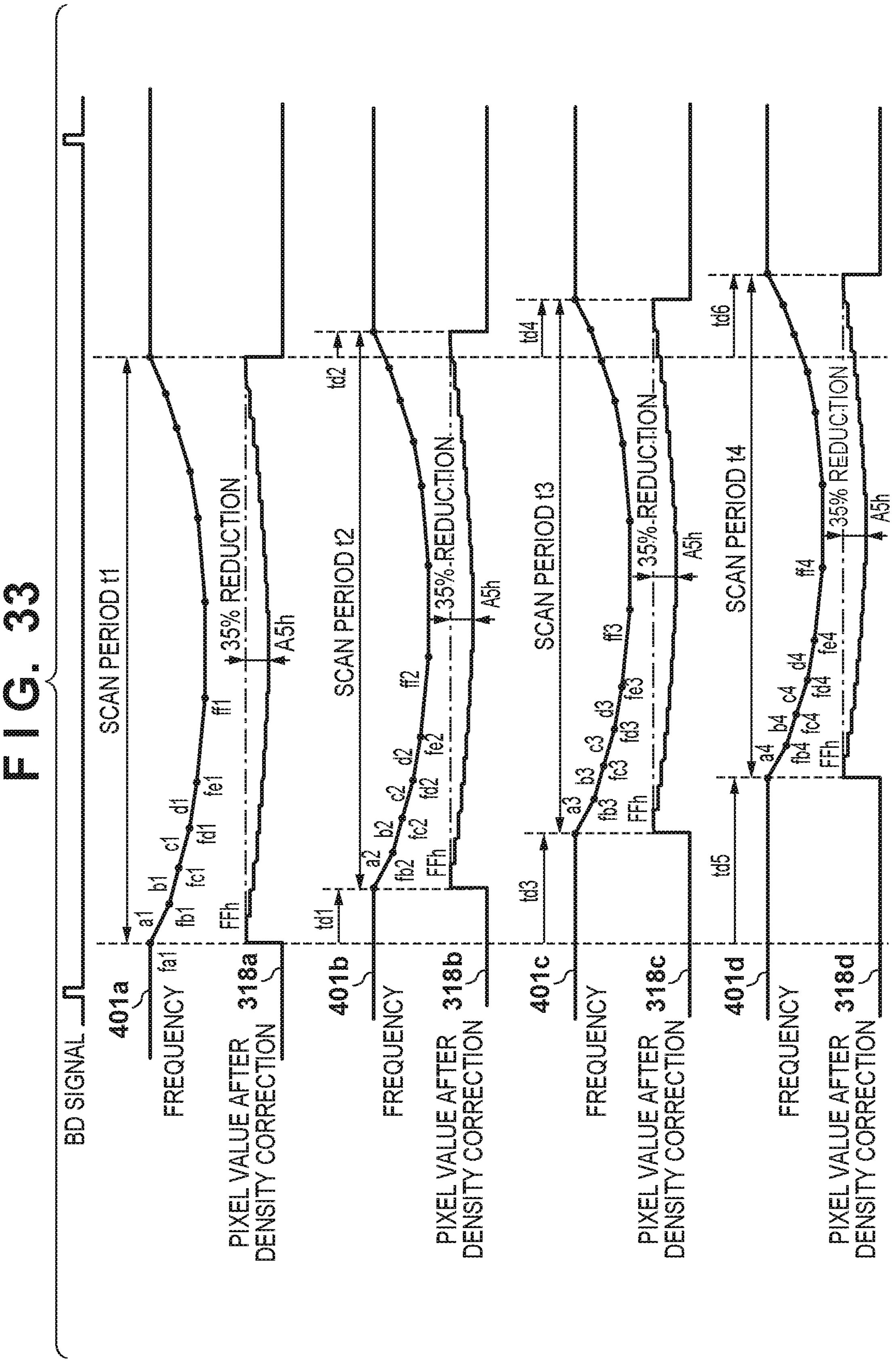
FIG. 33 is a timing chart of frequency correction and density correction according to an embodiment.

FIG. 24 shows a timing chart of frequency correction and density correction for a case where the scan beam 208*a* and the scan beam 208*b* are used. Note that the density correction is similar to that of FIG. 15. Furthermore, the frequency correction is similar to that of FIG. 20. FIG. 25 shows a timing chart of frequency correction and density correction for a case where the scan beam 208*a* and the scan beam 208*b* are used. Note that the density correction is similar to that of FIG. 15, and the frequency correction is similar to that of FIG. 22. Furthermore, FIG. 33 shows a timing chart of frequency correction and density correction for a case where four scan beams are used. Note that the frequency correction is similar to that of FIG. 31, and the density correction is similar to that of FIG. 15.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-025606, filed Feb. 22, 2022, which is hereby incorporated by reference herein in its entirety.

What is claimed is:

1. An image forming apparatus, comprising:

a photosensitive member;

a scan unit including at least a first light source and a second light source, the scan unit being configured to form an electrostatic latent image on the photosensitive member by emitting a first scan beam from the first light source and scanning a plurality of sections on the photosensitive member in a main scanning direction at an inconstant scan speed, and to form an electrostatic latent image on the photosensitive member by emitting a second scan beam from the second light source and scanning the plurality of sections on the photosensitive member in the main scanning direction at an inconstant scan speed; and a control unit configured to receive image signals for a plurality of pixels and to perform:

a first partial magnification correction for emitting the first scan beam from the first light source by changing a light emission interval of the first scan beam per pixel in accordance with which section in the main scanning direction is scanned by the first scan beam, when a region on the photosensitive member scanned by the first scan beam and the second scan beam is divided into the plurality of sections in the main scanning direction, a first density correction for emitting the first scan beam from the first light source by changing pulse widths of the image signals corresponding to an electrostatic latent image formed by the first scan beam in accordance with which section in the main scanning direction is scanned by the first scan beam, a second partial magnification correction for emitting the second scan beam from the second light source by changing a light emission interval of the second scan beam per pixel in accordance with which section in the main scanning direction is scanned by the second scan beam, and a second density correction for emitting the second scan beam from the second light source by changing pulse widths of the image signals corresponding to an electrostatic latent image formed by the second scan beam in accordance with which section in the main scanning direction is scanned by the second scan beam.

2. The image forming apparatus according to claim 1, further comprising a detection unit configured to detect the first scan beam, wherein the control unit controls scan start timings at which the first scan beam and the second scan beam start scanning of the photosensitive member, based on a detection timing at which the detection unit has detected the first scan beam, and the scan start timings of the first scan beam and the second scan beam differ from each other.

3. The image forming apparatus according to claim 2, wherein the scan start timing of the first scan beam precedes the scan start timing of the second scan beam.

4. The image forming apparatus according to claim 1, wherein first density correction information used in the first density correction and second density correction information used in the second density correction are the same.

5. The image forming apparatus according to claim 1, wherein first density correction information used in the first density correction and second density correction information used in the second density correction differ from each other.

6. The image forming apparatus according to claim 1, wherein pieces of correction information used in the first density correction and the second density correction each indicate a relationship between the plurality of sections in the main scanning direction and amounts of correction of pulse widths, and the control unit:

performs the first density correction by correcting pulse widths of a first image signal based on the pieces of correction information in accordance with which section in the main scanning direction is scanned by the first scan beam, the first image signal being for outputting the first scan beam, and performs the second density correction by correcting pulse widths of a second image signal based on the pieces of correction information in accordance with which section in the main scanning direction is scanned by the second scan beam, the second image signal being for outputting the second scan beam.

7. The image forming apparatus according to claim 6, wherein a first pulse width indicated by the first image signal when the first scan beam scans a third section is corrected to a second pulse width, the first pulse width indicated by the first image signal when the first scan beam scans a fourth section is corrected to a third pulse width shorter than the second pulse width, and a scan speed of the first scan beam in the third section is higher than a scan speed of the first scan beam in the fourth section, and a fourth pulse width indicated by the second image signal when the second scan beam scans a fifth section is corrected to a fifth pulse width, the fourth pulse width indicated by the second image signal when the second scan beam scans a sixth section is corrected to a sixth pulse width shorter than the fifth pulse width, and a scan speed of the second scan beam in the fifth section is higher than a scan speed of the second scan beam in the sixth section.

8. The image forming apparatus according to claim 1, wherein the scan unit exposes the photosensitive member to light in units of pixel pieces obtained by dividing one pixel, first partial magnification correction information used in the first partial magnification correction and second partial magnification correction information used in the second partial magnification correction each indicate a relationship between the plurality of sections in the main scanning direction and a number of pixel pieces per pixel, and the control unit:

performs the first partial magnification correction by changing a number of pixel pieces per pixel in a first image signal for outputting the first scan beam based on the first partial magnification correction information in accordance with which section in the main scanning direction is scanned by the first scan beam, and performs the second partial magnification correction by changing a number of pixel pieces per pixel in a second image signal for outputting the second scan beam based on the second partial magnification correction information in accordance with which section in the main scanning direction is scanned by the second scan beam.

9. The image forming apparatus according to claim 8, wherein the first partial magnification correction information and the second partial magnification correction information differ from each other.

10. The image forming apparatus according to claim 9, wherein the plurality of sections in the main scanning direction indicated by the first partial magnification correction information and the plurality of sections in the main scanning direction indicated by the second partial magnification correction information are the same sections.

11. The image forming apparatus according to claim 8, wherein the first partial magnification correction information and the second partial magnification correction information are the same.

12. The image forming apparatus according to claim 8, wherein a number of pixel pieces indicated by the first image signal for scanning of a third section in the main scanning direction by the first scan beam is a first number, a number of pixel pieces indicated by the first image signal for scanning of a fourth section by the first scan beam is a second number greater than the first number, and a scan speed of the first scan beam in the third section is higher than a scan speed of the first scan beam in the fourth section, and a number of pixel pieces indicated by the second image signal for scanning of a fifth section in the main scanning direction by the second scan beam is a third number, a number of pixel pieces indicated by the second image signal for scanning of a sixth section by the second scan beam is a fourth number greater than the third number, and a scan speed of the second scan beam in the fifth section is higher than a scan speed of the second scan beam in the sixth section.

13. The image forming apparatus according to claim 1, wherein first partial magnification correction information used in the first partial magnification correction and second partial magnification correction information used in the third second partial magnification correction indicate frequencies at positions of end portions of the respective sections in the main scanning direction, and the control unit:

performs the first partial magnification correction by changing a frequency of a first image signal based on the first partial magnification correction information in accordance with which section in the main scanning direction is scanned by the first scan beam, the first image signal being for outputting the first scan beam, and performs the second partial magnification correction by changing a frequency of a second image signal based on the second partial magnification correction information in accordance with which section in the main scanning direction is scanned by the second scan beam, the second image signal being for outputting the second scan beam.

14. The image forming apparatus according to claim 13, wherein the control unit:

causes the frequency of the first image signal to change based on frequencies at positions of two end portions of a first section indicated by the first partial magnification correction information while the first scan beam is scanning the first section, and causes the frequency of the second image signal to change based on frequencies at positions of two end portions of a second section indicated by the second partial magnification correction information while the second scan beam is scanning the second section.

15. The image forming apparatus according to claim 13, wherein the first image signal has a first frequency when the first scan beam scans a third section in the main scanning direction, the first image signal has a second frequency lower than the first frequency when the first scan beam scans a fourth section, and a scan speed of the first scan beam in the third section is higher than a scan speed of the first scan beam in the fourth section, and the second image signal has a third frequency when the second scan beam scans a fifth section in the main scanning direction, the second image signal has a fourth frequency lower than the third frequency when the second scan beam scans a sixth section, and a scan speed of the second scan beam in the fifth section is higher than a scan speed of the second scan beam in the sixth section.

* * * * *